US012737507B1

(12) United States Patent
Barbagallo

(10) Patent No.: US 12,737,507 B1
(45) Date of Patent: Sep. 15, 2026

(54) OUTDOOR KITCHEN DESIGN PLATFORM

(71) Applicant: Anthony Barbagallo, Staten Island, NY (US)

(72) Inventor: Anthony Barbagallo, Staten Island, NY (US)

(*) Notice: Subject to any disclaimer, the term of this patent is extended or adjusted under 35 U.S.C. 154(b) by 1160 days.

(21) Appl. No.: 17/719,741

(22) Filed: Apr. 13, 2022

Related U.S. Application Data

(60) Provisional application No. 63/303,559, filed on Jan. 27, 2022.

(51) Int. Cl.

| | |
|---|---|
| ***G06F 30/12*** | (2020.01) |
| ***G06F 30/13*** | (2020.01) |
| ***G06Q 30/0601*** | (2023.01) |
| *G06F 111/02* | (2020.01) |
| *G06F 111/16* | (2020.01) |
| *G06F 111/18* | (2020.01) |
| *G06F 111/20* | (2020.01) |

(52) U.S. Cl.
CPC .............. *G06F 30/12* (2020.01); *G06F 30/13* (2020.01); *G06Q 30/0611* (2013.01); *G06Q 30/0621* (2013.01); *G06Q 30/0643* (2013.01); *G06F 2111/02* (2020.01); *G06F 2111/16* (2020.01); *G06F 2111/18* (2020.01); *G06F 2111/20* (2020.01)

(58) Field of Classification Search
CPC ...... G06F 30/12; G06F 30/13; G06F 2111/16; G06F 2111/02; G06F 2111/20; G06F 2111/18; G06Q 30/0611; G06Q 30/0621; G06Q 30/0643
See application file for complete search history.

(56) References Cited

U.S. PATENT DOCUMENTS

| | | | | |
|---|---|---|---|---|
| 7,062,722 | B1 | 6/2006 | Carlin et al. | |
| 8,253,731 | B2 * | 8/2012 | Hoguet | G06T 19/00 345/582 |
| 10,228,836 | B2 | 3/2019 | Palmaro | |
| 10,600,255 | B2 | 3/2020 | Besecker et al. | |
| 2013/0179841 | A1 | 7/2013 | Mutton et al. | |

(Continued)

FOREIGN PATENT DOCUMENTS

| | | | | |
|---|---|---|---|---|
| CA | 2588964 A1 * | 5/2006 | | G06Q 10/087 |

OTHER PUBLICATIONS

Broadhead (Year: 2012).*

*Primary Examiner* — Ryan F Pitaro
*Assistant Examiner* — Adrian Stoica
(74) *Attorney, Agent, or Firm* — Michael A. DiNardo; YK LAW LLP

(57) ABSTRACT

A design platform which provides a virtual design interface allowing a user to define a support frame, select and place virtual components representing appliances upon the support frame, and create a customized layout for an outdoor kitchen embodying the user defined customizations. The design platform has an output module which exports the customized layout in a template format which facilitates fabrication of components in accordance with the customized layout, and assembly of the components and selected appliances to create the outdoor kitchen. The design platform further allows providers such as manufactures, distributors, retailers, and contractors to view the customized layout and submit a quote for the fabrication and assembly of the outdoor kitchen.

20 Claims, 20 Drawing Sheets

(56) References Cited

U.S. PATENT DOCUMENTS

| | | | | |
|---|---|---|---|---|
| 2015/0324940 | A1 | 11/2015 | Samson et al. | |
| 2019/0347859 | A1 | 11/2019 | Jovanovic et al. | |
| 2019/0354652 | A1 | 11/2019 | Huebner | |
| 2020/0096978 | A1* | 3/2020 | Baker | G05B 19/4097 |
| 2020/0202614 | A1 | 6/2020 | Gilpin et al. | |
| 2021/0334888 | A1 | 10/2021 | Mai et al. | |

* cited by examiner

| Component | |
|---|---|
| Brand: Brand A | |
| Type: | Storage Drawers Appliance |
| Name: Deluxe Drawers | |
| DR0025 | |
| Manufacturer: | A Corporation |
| Pricing: | Distributor $50 / Customer $100 |
| Model: | 21" Drawer |

60, 68B, 68T, 68N, 68D, 68M, 68D, 68L

60D

| Dimension Data | |
|---|---|
| H | 27" |
| W | 21" |
| D | 20" |

62, 62H, 62W, 62D

60D

| Cutout Data | |
|---|---|
| H | 25" |
| W | 20" |
| D | 20" |
| Placement Surface | Vertical |

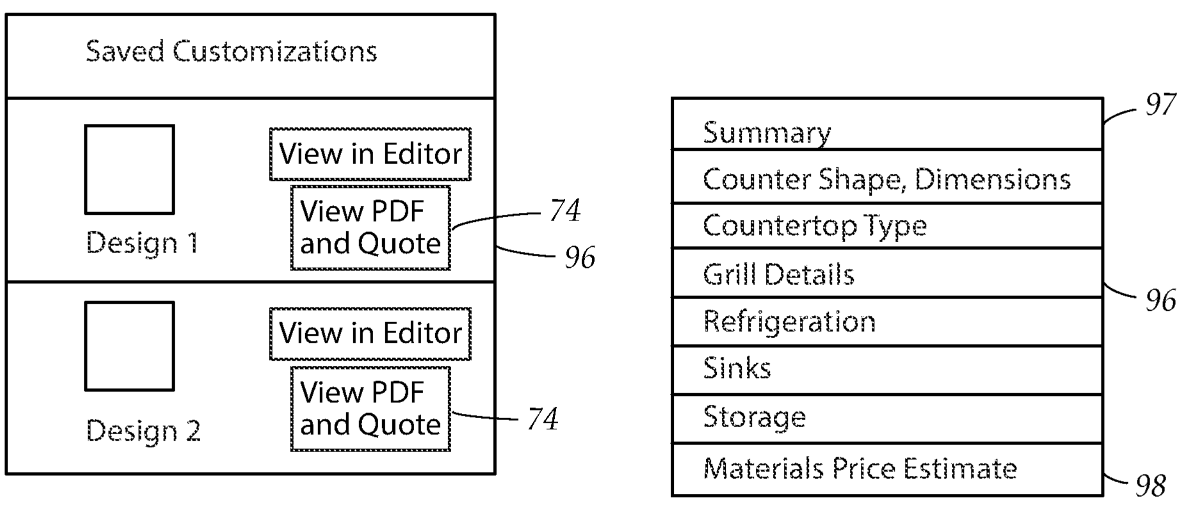
FIG. 9C
FIG. 9D
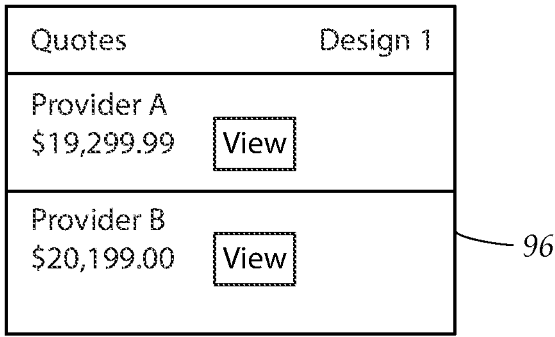
FIG. 9E

OUTDOOR KITCHEN DESIGN PLATFORM

CROSS-REFERENCE TO RELATED APPLICATIONS

This application is a nonprovisional utility application of provisional patent application, Ser. No. 63/303,559 filed in the United States Patent Office on Jan. 27, 2022, claims priority therefrom, and is expressly incorporated herein by reference in its entirety.

TECHNICAL FIELD

The present disclosure relates generally to application software and systems which allow a user to create a customized layout. More particularly, the present disclosure relates to a design platform which allows users to create customized layouts for outdoor kitchens, and transfer the customized layouts to providers in the form of templates which facilitate fabrication and installation.

BACKGROUND

Often a commercially available, mass-produced outdoor kitchen provides a less than ideal fit for a customer. The size and layout might not be suitable for the intended location. The configuration, equipment, and options might be far from what the customer wants. Undoubtedly, the purchase of a mass-produced outdoor kitchen will require significant compromise on the part of the customer.

A professionally designed outdoor kitchen can alleviate all of the difficulties of a cookie-cutter, mass-produced kitchen. The professional designer can provide the customer with exactly what is desired, and configure the kitchen to perfectly fit the available installation area and work in harmony with its surroundings. Unfortunately, hiring a designer or design firm to create a custom design can be cost prohibitive for most customers. Even when the design services are 'rolled in' to the production bill, customized kitchens produced from the designer's drawings and concepts often lack sufficient standardization to be produced economically. Thus, the overall expense to the customer can still be cost prohibitive.

What is needed is a design platform that allows a customer to create a customized outdoor kitchen design that fits their needs, desired features, and installation location, while allowing efficient and economic manufacturing and ease of installation—even by less skilled contractors and even consumers.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system which allows a user to design a food preparation structure using predefined components. Accordingly, the present disclosure provides a design platform which provides a virtual design interface having design tools which allow a user to define a support frame, select one or more virtual components representing appliances, and place the selected virtual components upon the support frame to form a customized layout. The virtual design interface further displays graphical preview showing the customized layout within a virtual design space.

It is another aspect of an example embodiment in the present disclosure to provide a system which allows the user to customize the configuration and dimensions of the food preparation structure, and reposition the appliances according to the user's requirements. Accordingly, the virtual design interface allows the user to define user inputs including a perimeter shape, perimeter dimensions, and frame material selection which are used to generate the support frame and define a plurality of vertical faces and a horizontal face thereon. The virtual design interface further allows the user to place the appliance upon a placement surface corresponding to one of the vertical faces or the horizontal face in accordance with a planar orientation of the appliance. The virtual design interface further allows the user to resize the vertical faces or the horizontal face within the graphical preview.

It is yet another aspect of an example embodiment in the present disclosure to provide a system which prepares the customized layout for fabrication and assembly. Accordingly, the design platform stores the customized layout using customization data which precisely describes the support frame, the structural components which form the support frame and the positions thereof, and the appliances along with the positions of the appliances upon the support frame. The design platform further has an output module which exports the customized layout to produce templates which allows a food preparation structure embodying the customized layout to be fabricated and installed.

It is a further aspect of an example embodiment in the present disclosure to provide a system which allows the user to transfer the customized layout to providers. Accordingly, the design platform allows provider users representing manufacturers, distributors, retailers, or contractors to view the customized layout and submit a quote for the fabrication and installation of food support structure embodying the customized layout.

It is still a further aspect of an example embodiment in the present disclosure to provide a system which allows providers to operate custom portals linked to the design platform. Accordingly, the design platform allows each provider to maintain a provider portal through which the virtual design interface is accessible, which allows the user to create the customized layout using only components which are offered by the provider.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 3E is a diagram depicting exemplary component data for a virtual component representing an appliance, in accordance with an embodiment in the present disclosure.

FIG. 9C is a diagrammatical representation of the quote management interface, in accordance with an embodiment in the present disclosure.

FIG. 9D is a diagrammatical representation of a design summary, in accordance with an embodiment in the present disclosure.

FIG. 9E is a diagrammatical representation of the quote management interface showing a list of selectable quotes, in accordance with an embodiment in the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
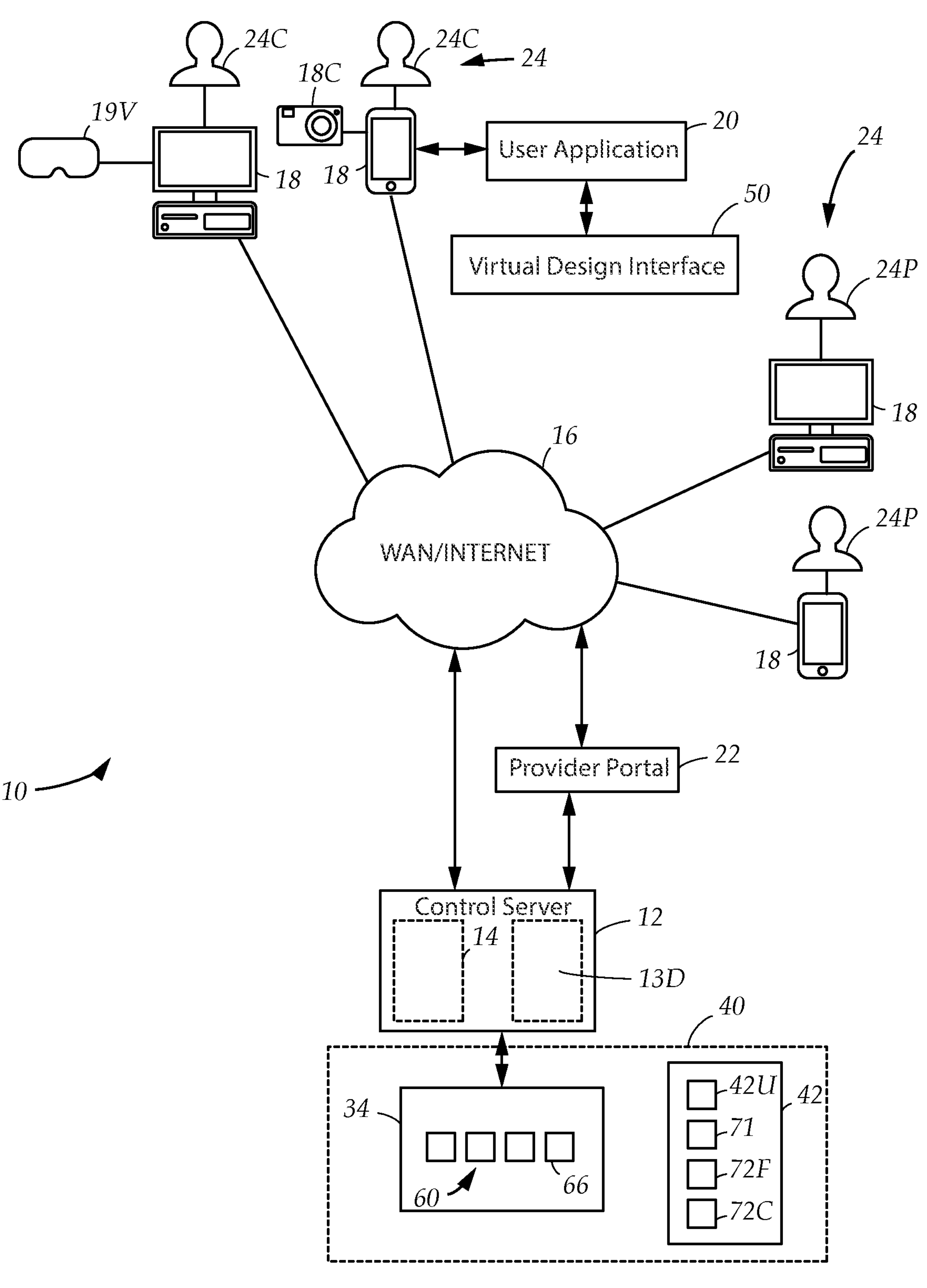
FIG. 1A is a block diagram depicting an example network architecture for a design platform, in accordance with an embodiment in the present disclosure.
Figure 1B:
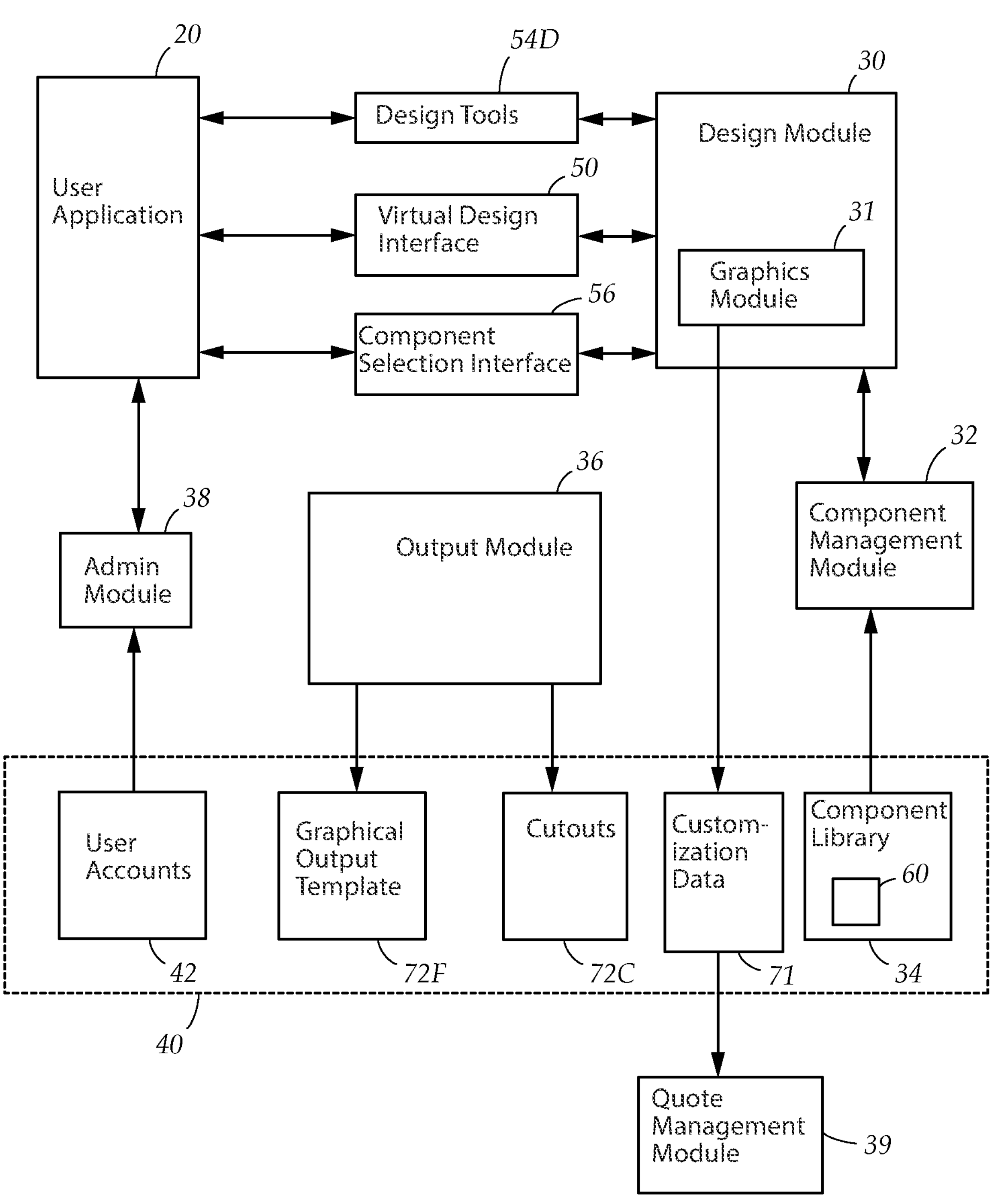
FIG. 1B is a block diagram showing a plurality of platform modules through which the functions of the design platform are carried out, in accordance with an embodiment in the present disclosure.
Figure 1C:
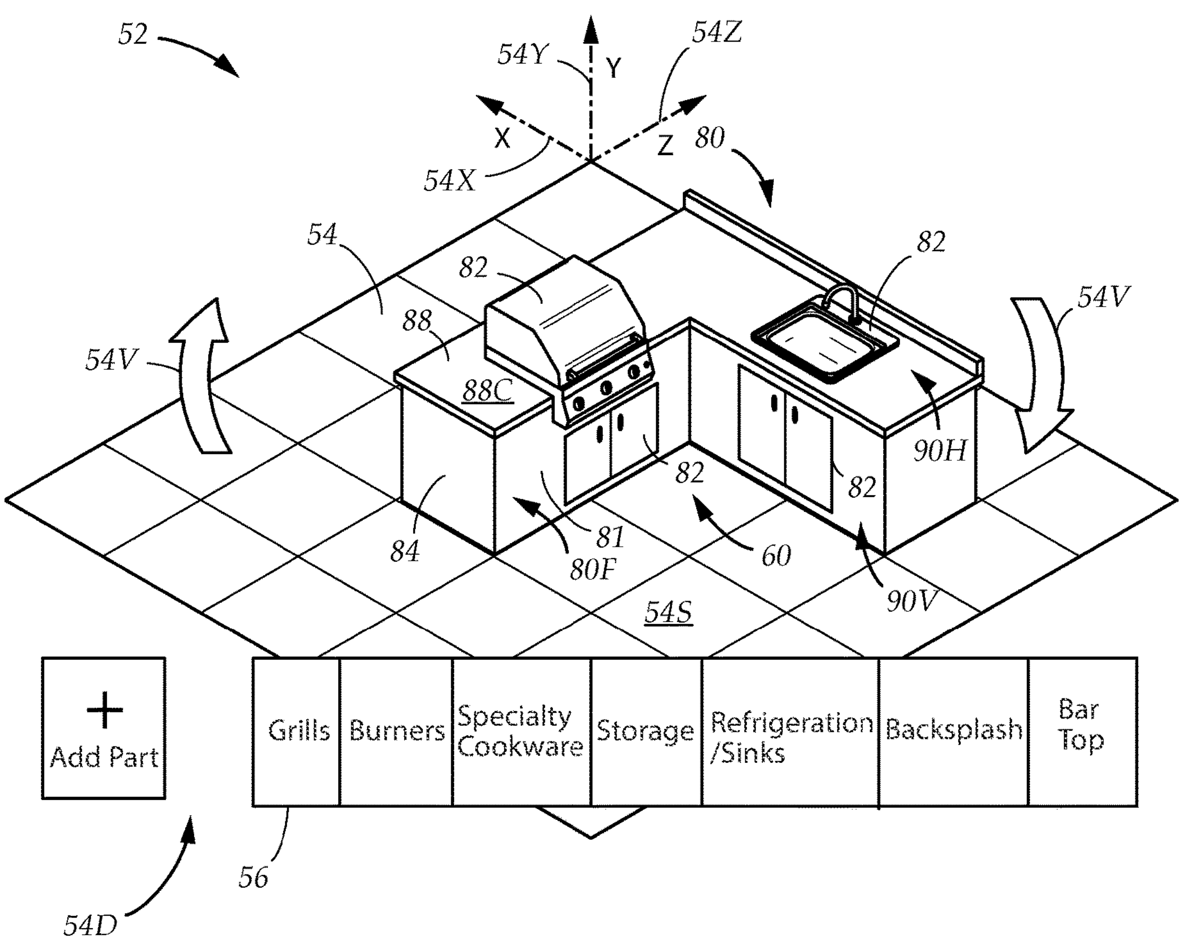
FIG. 1C is a diagrammatical depiction of a virtual design interface with a graphical preview which displays a customized layout and a set of design tools, in accordance with an embodiment in the present disclosure.

FIGS. 1A-C illustrate a design platform 10 with a virtual design interface 50 which allows a user 24 to create and edit a customized layout which virtually represents a food preparation structure 80 with integrated appliances 82. The food preparation structure 80 may be an outdoor kitchen island and countertop, along with a grill, a sink, or other appliances 82 selected by the user 24. The virtual design interface 50 allows the user 24 to manipulate virtual components 60 representing physical components to create the customized layout. The virtually represented physical components include structural components 84 which are assembled to form the food preparation structure 80, as well as the appliances 82 which are installed within the food preparation structure 80. The design platform 10 further utilizes the arrangement of the virtual components 60 of the customized layout to generate templates which facilitate fabrication of the corresponding physical components and the assembly thereof.

The kitchen design platform 10 comprises a control server 12, a platform data store 40, and a user application 20 through which the virtual design interface 50 is presented. The user application 20 is implemented on one of a plurality of user devices 18 which communicate with the control server 12 via a data communication network 16 such as the internet. In one embodiment, the user application 20 may be locally executed as a program on one of the user devices 18, or as a web application within a website operated by the design platform 10. In each case, the user application 20 may store and retrieve data centrally via the control server 12 and the platform data store 40.

Figure 2A:
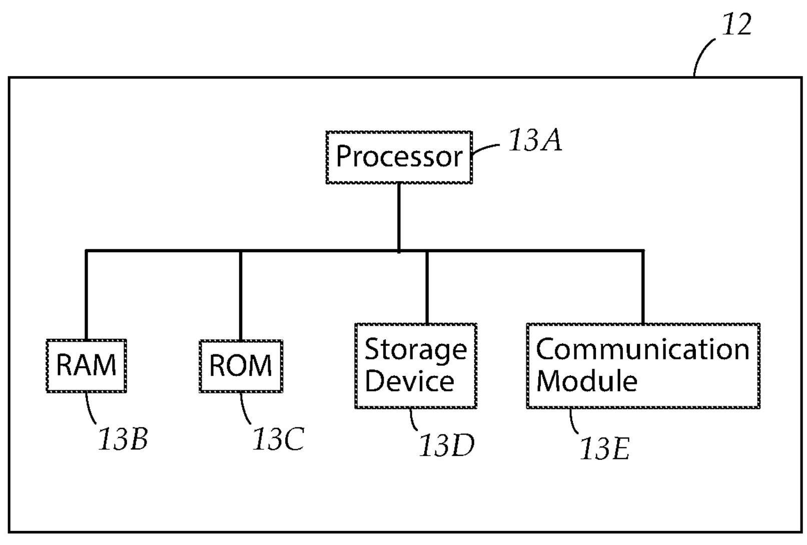
FIG. 2A is a block diagram depicting an exemplary control server, in accordance with an embodiment in the present disclosure.
Figure 2B:
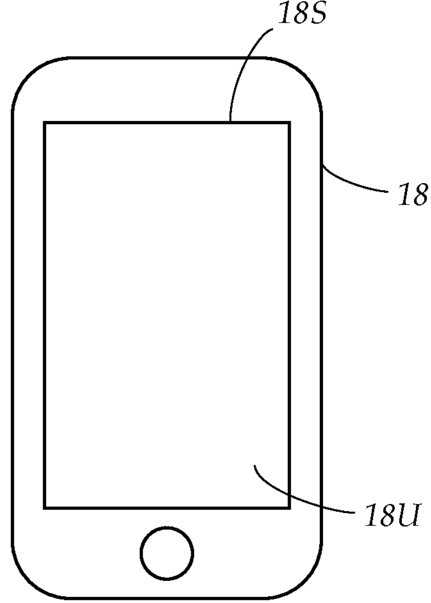
FIG. 2B is a diagrammatical front view of an exemplary user device with a device display and touch screen, in accordance with an embodiment in the present disclosure.

Referring to FIG. 2B while also referring to FIGS. 1A-C, each of the user devices 18 is a computing device such as a smartphone, tablet, personal computer, or other similar device. In one embodiment, each user device 18 has a device screen 18S configured to display graphical and text content which form the virtual design interface 50. Each user device further has an input device, such as a touchscreen 18U, keyboard, mouse, or other device for receiving and registering user input, thus allowing the user device 18 to convey user commands to interact with the virtual design interface 50 and the design platform 10.

The control server 12 is adapted to execute a plurality of platform functions through which the features of the design platform 10 are carried out. In a preferred embodiment, the platform functions are executed through a plurality of platform modules implemented via the control server 12, with each platform module carrying out one aspect of the functionality of the design platform 10. The platform modules comprise a design module 30, a graphics module 31, a component management module 32, an output module 36, an admin module 38, and a quote management module 39. Each of the platform modules corresponds to a hardware component, software component, or computer program which executes one or more program routines. In certain embodiments, the control server 12 may also act as a web server 14 by hosting or carrying out functions related to web sites under the control of the design platform 10.

In one embodiment, the graphics module 31 may be implemented using graphics libraries and graphics APIs which allow the user application 20 to display three dimensional graphics. In one embodiment, the platform data store 40 contains graphical data files 66, such as geometry and textures, which allow the graphics module 31 to display virtual representations of each of the virtual components 60 and other associated parts and materials which may be used to form a graphical representation of the food preparation structure 80.

Referring to FIG. 2A while also referring to FIGS. 1A-B, the control server 12 may be implemented using a computing device having a processor 13A, a RAM 13B, a ROM 13C, a computer storage device 13D, and a communication module 13E. In a preferred embodiment, the control server 12 may be implemented using server hardware configured to execute computing intensive operations and allow multiple user devices 18 to access the platform functions simultaneously. As such, the communication module 13E is adapted to communicate with the user devices 18 as well as other computing devices and platforms via the data communication network 16.

Returning to FIGS. 1A-C while also referring to FIG. 2A, the platform data store 40 functions as a central repository for storing and managing platform data which is essential to the operation of the design platform 10 and the platform modules. In one embodiment, the platform data store 40 is stored via the computer storage device 13D of the control server 12, and contains a component library 34, user data 42, and customization data 71. In one embodiment, the user data 42 contains a plurality of user profiles 42U each associated with one of the users 24 of the design platform 10, and the admin module 38 is adapted to create and maintain the user profiles 42U as well as control access by the users 24 to the design platform 10.

The users 24 comprise customers 24C and provider users 24P. Provider users 24P represent businesses or individuals, such as contractors, manufacturers, or distributors, who are in the business of selling and/or installing components and appliances. The design platform 10 allows both customers 24C and provider users 24P to create, view, and edit customized layouts, and the design platform allows customers 24C to submit customized layouts and receive quotes from provider users 24P for the purchase and/or installation of a food preparation structure 80 embodied by the customized layout.

In one embodiment, the design module 30 is configured to implement the virtual design interface 50, and provides a plurality of design tools 54D which enable the users 24 to create and edit the customized layouts. In a preferred embodiment, the virtual design interface 50 comprises a graphical preview 52 which displays a virtual design space 54. The virtual design space 54 is a virtual three dimensional space containing a planar virtual surface 54S which represents a physical installation surface such as a floor or ground surface. For example, the virtual design space 54 may contain an X-axis 54X, a Z-axis 54Z, and a Y-axis 54Y, with the virtual surface 54 forming a plane across the X-axis 54X and the Z-axis 54Z, while the Y-axis 54Y points in an upward direction.

The design tools 54D may comprise a plurality of view controls 54V, and a component selection interface 56. The view controls 54D allow the user 24 to move or adjust a virtual camera within the virtual design space 54. For example, the view controls 54D may rotate, elevate, or pan the graphical preview 52 to allow the user 24 to view the virtual design space 54 from different perspectives or through different levels of zoom. The virtual design interface 50 allows the user 24 to select, edit, and place a virtual component 60 using a selection interface 56, and further allows the user 24 to define and place a support frame 80F upon the virtual surface 54S.

Figure 3A:
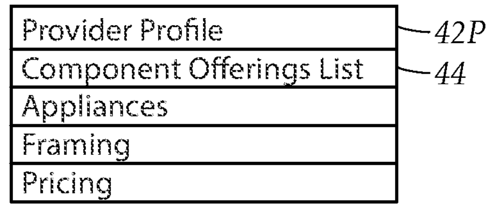
FIG. 3A is a diagram depicting an exemplary provider profile, in accordance with an embodiment in the present disclosure.
Figure 3B:
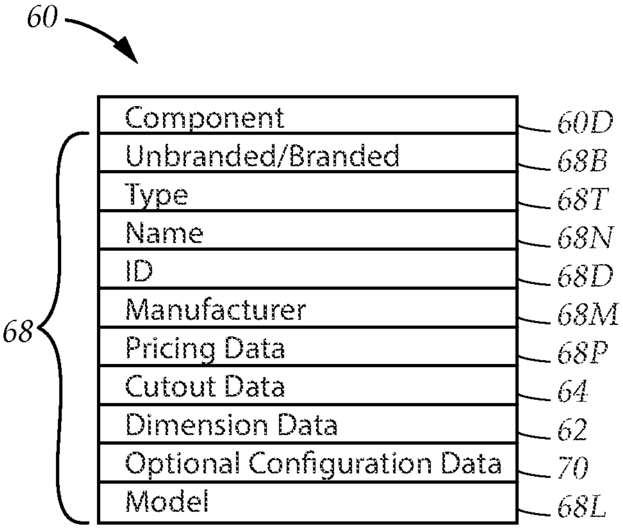
FIG. 3B is diagram depicting exemplary component data which describes a virtual component, in accordance with an embodiment in the present disclosure.

Turning to FIG. 3B while continuing to refer to FIGS. 1A-C, the virtual components 60 which are made available to the user 24 via through the virtual design interface 50 are represented via component data 60D organized within the component library 34. Each virtual component 60 represents a physical component, and the component data 60D contains information which allows the design module 30 to accurately model the physical component within the virtual design space 54 and manage interactions between the virtual component 60 and other virtual components 60. In a preferred embodiment, the component management module 32 is adapted to maintain the component library 40 and facilitate the adding of new virtual components 60 as well as the editing of component data 60D.

In one embodiment, the component data 60D for each virtual component 60 may comprise product metadata 68, placement data including dimension data 62 and cutout data

64, as well as optional configuration data 70. The product metadata 68 facilitates organization and classification of the virtual component 60, while the dimension data 62 and cutout data 64 model physical characteristics of the physical component to which the virtual component 60 corresponds.

In one embodiment, the product metadata 68 may include a brand classification 68B, a type classifier 68T, model identifier 68L, a product name 68N, a product identifier 68D, a manufacturer identifier 68M, and pricing data 68P. The brand classification 68B and manufacturer identifier 68M function as attribution data which can identify a particular manufacturer, supplier, or distributor which sells or manufacturers the physical components associated with the virtual component. The brand classification 68B identifies whether the physical component which the virtual component 60 represents is associated with a particular product brand or whether the physical component is generic or otherwise unbranded. The product metadata 68 may also include optional configuration data 70, which may identify user-selectable functional characteristics such as optional appliance features, or aesthetic characteristics such as color or finish.

The physical components represented by the virtual components 60 are categorized in accordance with a plurality of component types, as identified by the type identifier 68T contained within the component data 60D of each virtual component 60. Each component type further identifies a function which the physical component fulfills as part of a food preparation structure 80. The component types may comprise appliance types, structural components 84, and top components 88. Appliances 82 are categorized by function. For example, the appliance types may include grills, burners, specialty cookware, storage, refrigeration, sinks, or other types as appropriate.

Figure 5A:
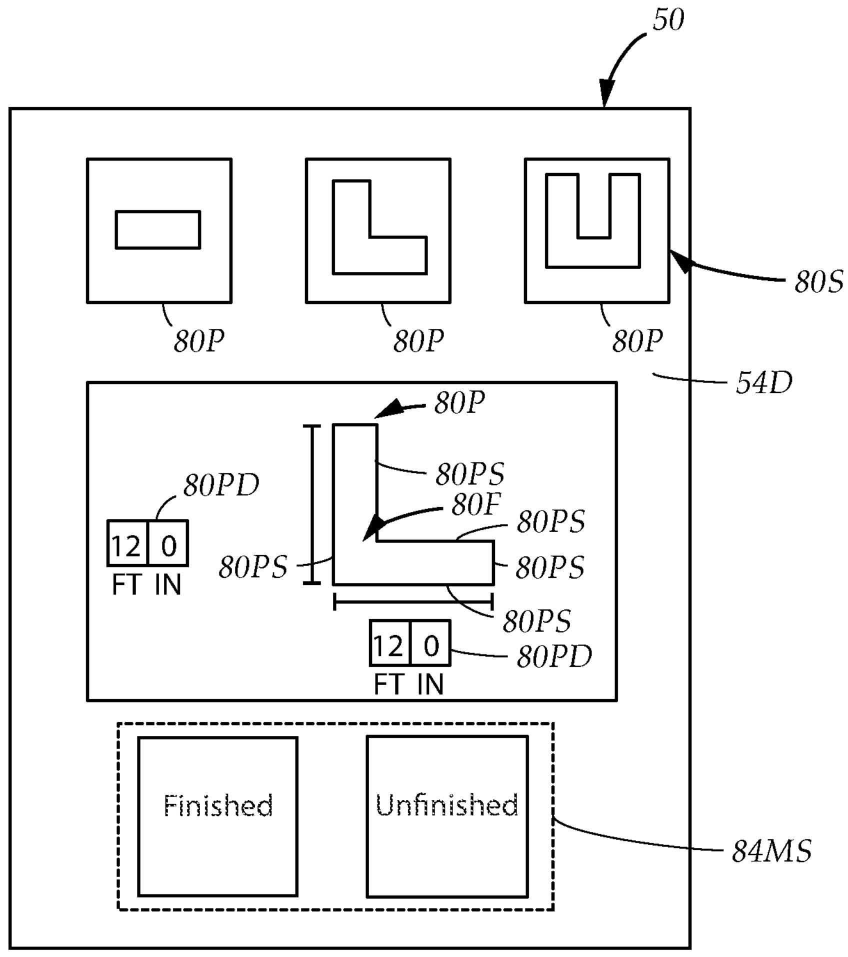
FIG. 5A is a diagrammatic representation of a selection interface which allows the user to define perimeter shape and perimeter dimensions for generating a support frame, in accordance with an embodiment in the present disclosure.
Figure 5B:
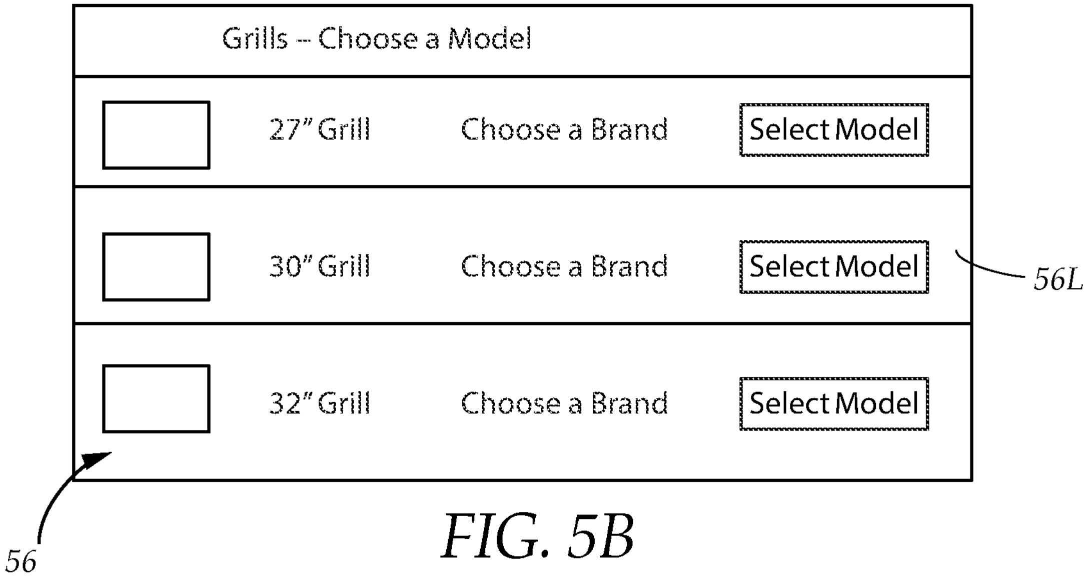
FIG. 5B is a diagrammatic representation of appliances displayed in the component selection interface by type, in accordance with an embodiment in the present disclosure.
Figure 5C:
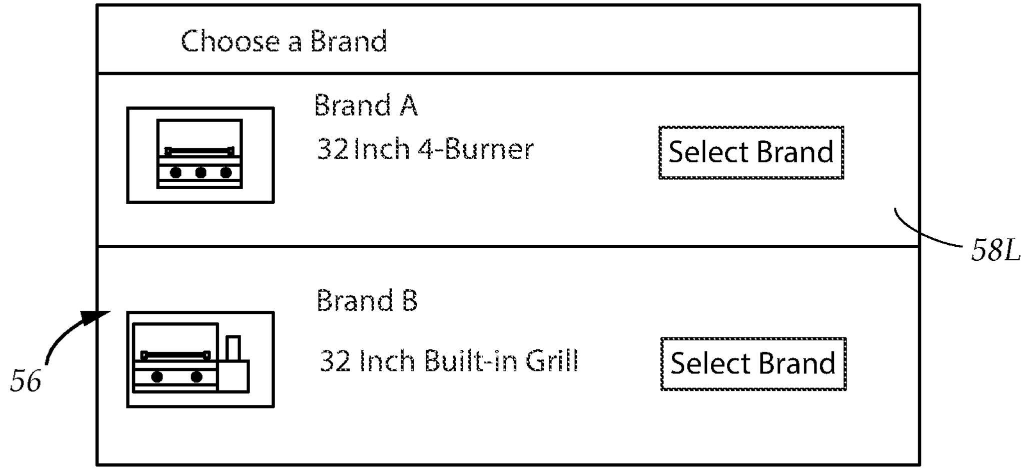
FIG. 5C is a diagrammatic representation of appliances displayed in the component selection interface by brand, in accordance with an embodiment in the present disclosure.

Referring briefly to FIGS. 5B-C, while also referring to FIG. 1A, FIG. 1C, and FIG. 3B, the component selection interface 56 allows the user 24 to view and select virtual components 60 using various filtering and categorization options based on characteristics within the product metadata 68. For example, the component selection interface 56 may display a component list 56L which is filtered according to one or a combination of brand classification 68B, type 68T, model 68L, or other characteristics within the product metadata 68.

Figures 6A, 6B:
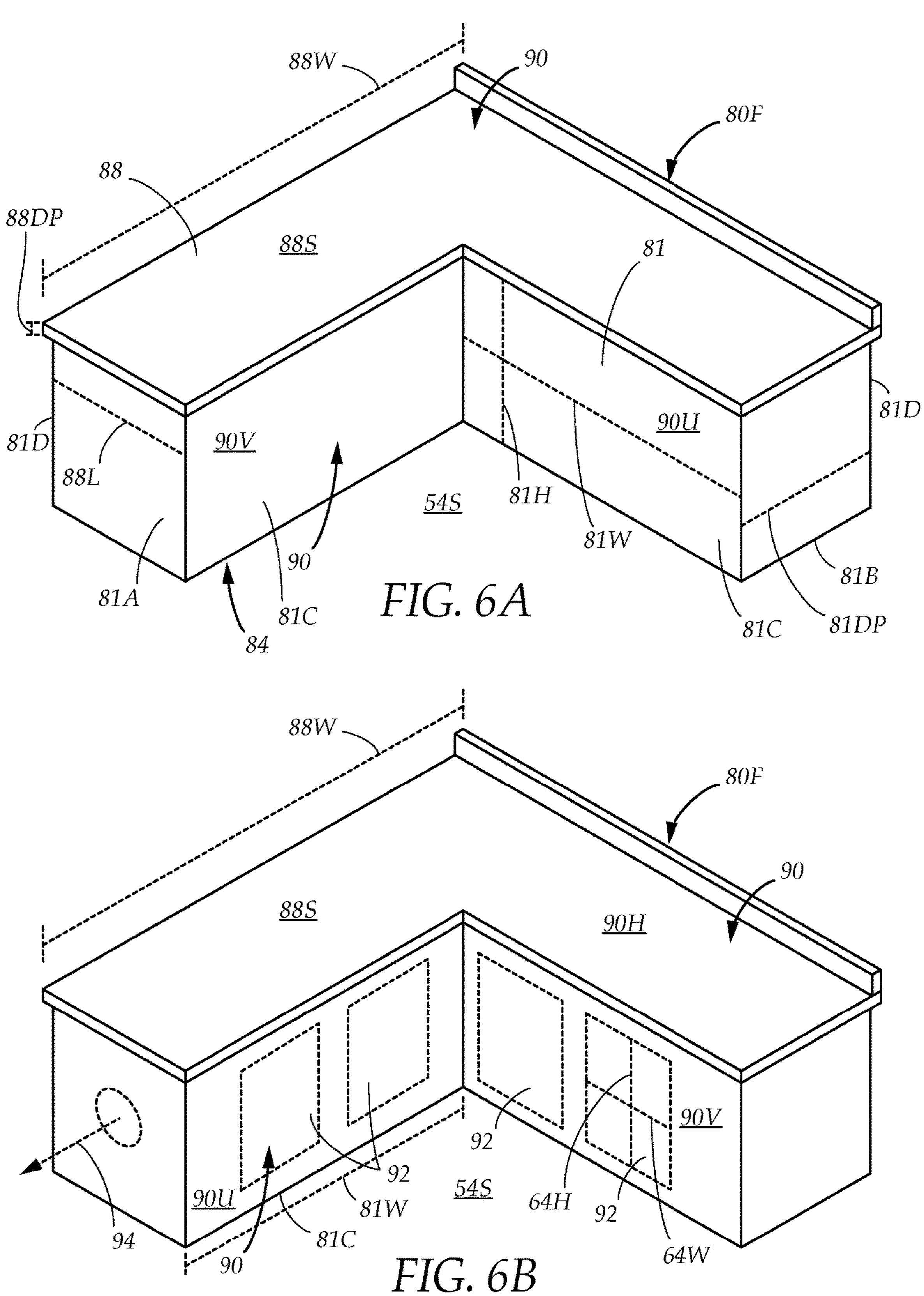
FIG. 6A is a diagrammatic perspective view of the support frame within the graphical preview, in accordance with an embodiment in the present disclosure.
FIG. 6B is a diagrammatic perspective view of the support frame within the graphical preview, further showing placement point previews marking locations upon which the appliance may be placed, in accordance with an embodiment in the present disclosure.
Figure 7A:
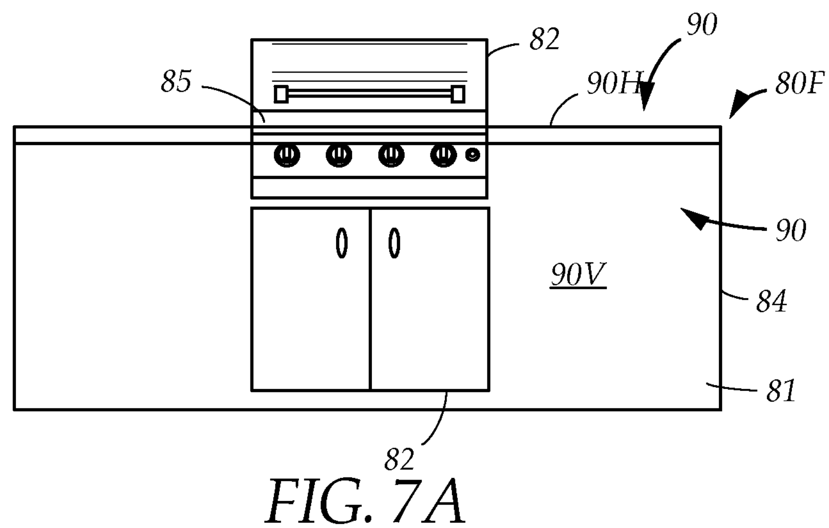
FIG. 7A is a diagrammatic front view of a portion of the support frame showing a grill and a storage appliance positioned on horizontal and vertical placement surfaces respectively, in accordance with an embodiment in the present disclosure.
Figure 7B:
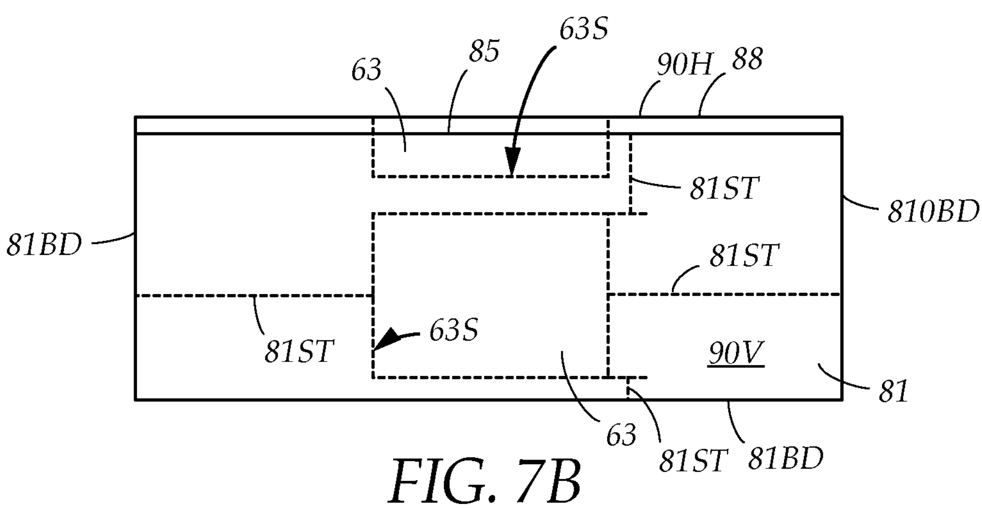
FIG. 7B is a diagrammatic elevation view showing a cutout arranged on a vertical face of the support frame, in accordance with an embodiment in the present disclosure.
Figure 7C:
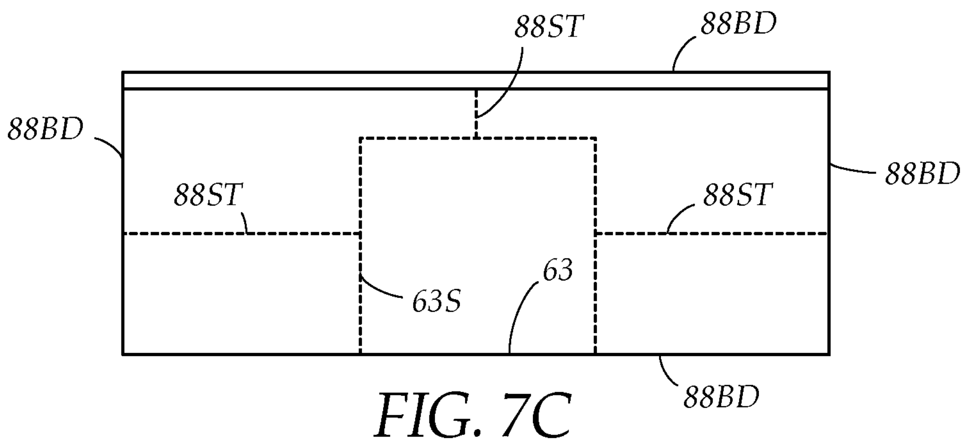
FIG. 7C is a diagrammatic plan view showing a cutout arranged on a horizontal face of the support frame, in accordance with an embodiment in the present disclosure.
Figure 7D:
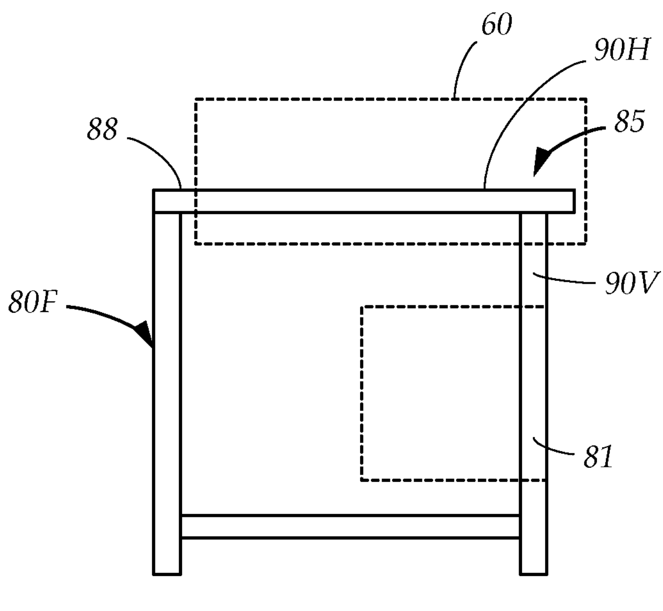
FIG. 7D is a diagrammatic side view showing an appliance intersecting both a horizontal placement surface and a vertical placement surface along a common edge, in accordance with an embodiment in the present disclosure.
Figure 7E:
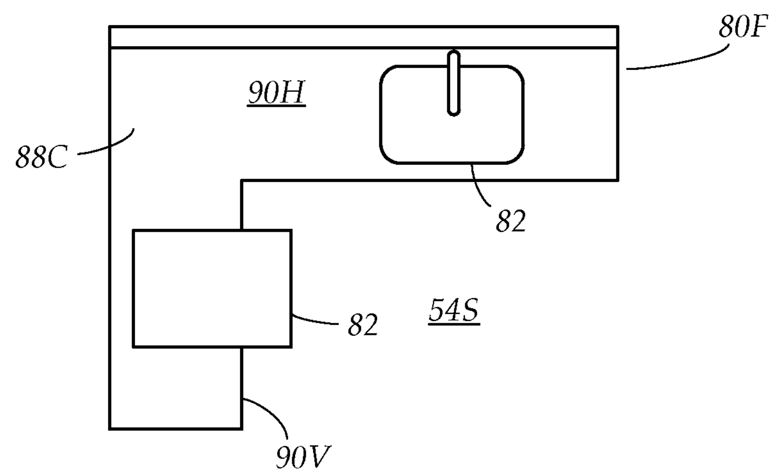
FIG. 7E is a diagrammatic top view of the support frame showing a sink and a grill disposed on the top component, in accordance with an embodiment in the present disclosure.
Figure 7F:
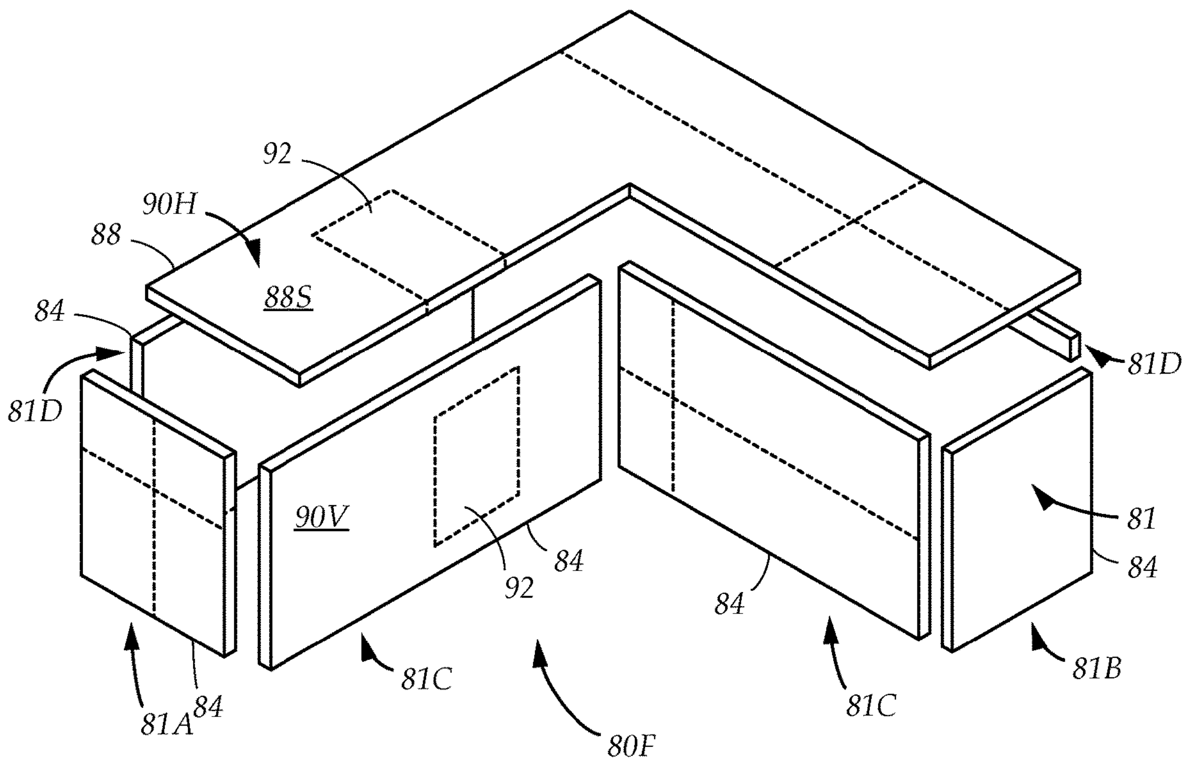
FIG. 7F is a diagrammatic exploded view showing the structural components which form the support frame, in accordance with an embodiment in the present disclosure.
Figure 8:
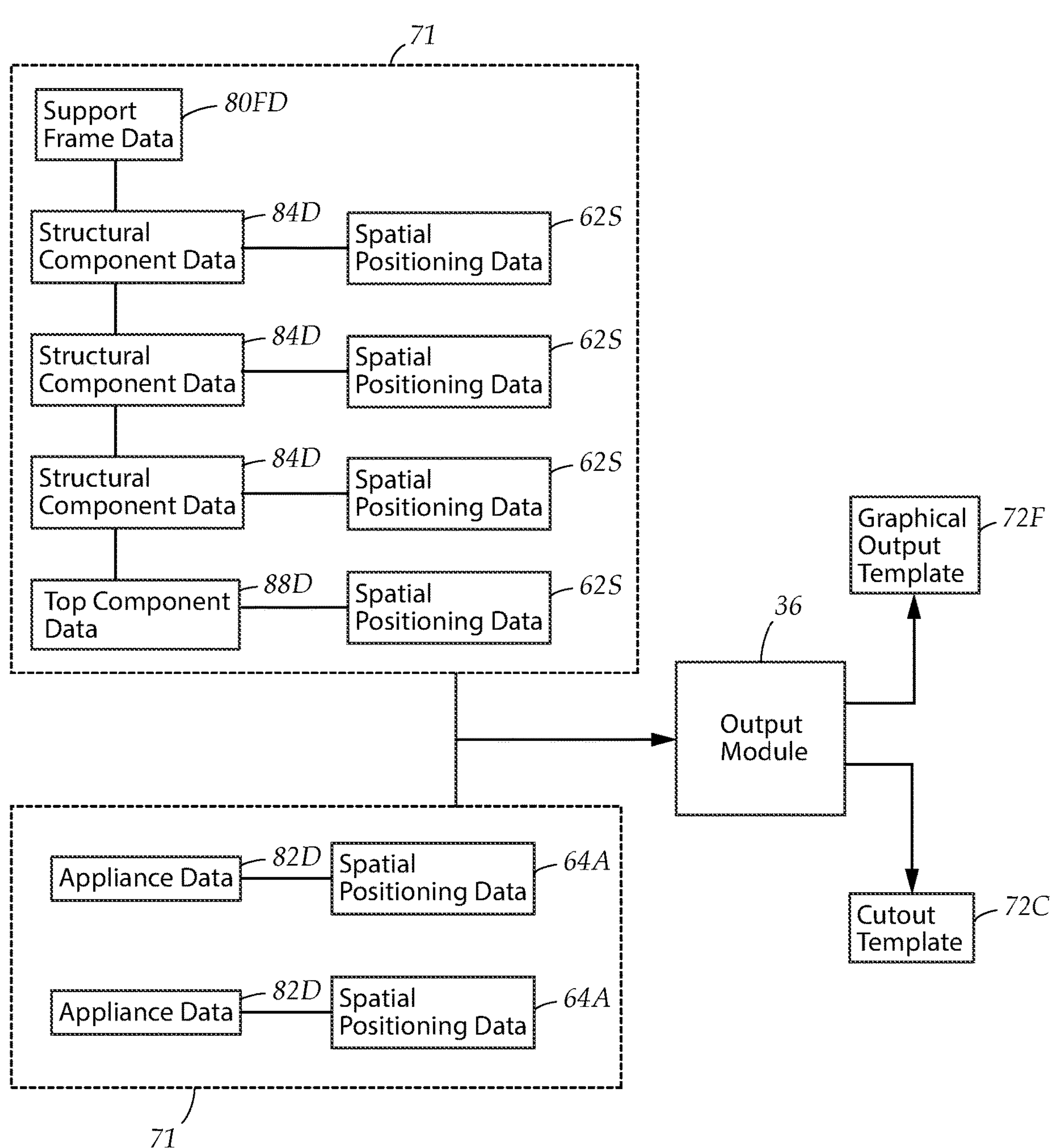
FIG. 8 is a block diagram showing the output module converting customization data to generate a graphical output template and a cutout template to facilitate fabrication and assembly of the customized layout, in accordance with an embodiment in the present disclosure.
Figure 9A:
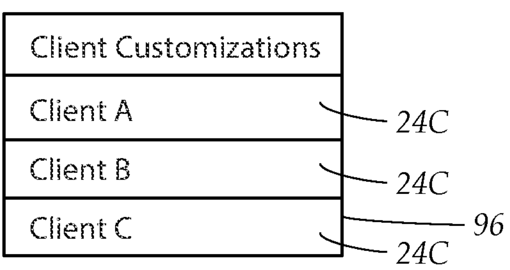
FIG. 9A is a diagrammatical representation of a list of customer users viewable by one of the provider users, in accordance with an embodiment in the present disclosure.
Figure 9B:
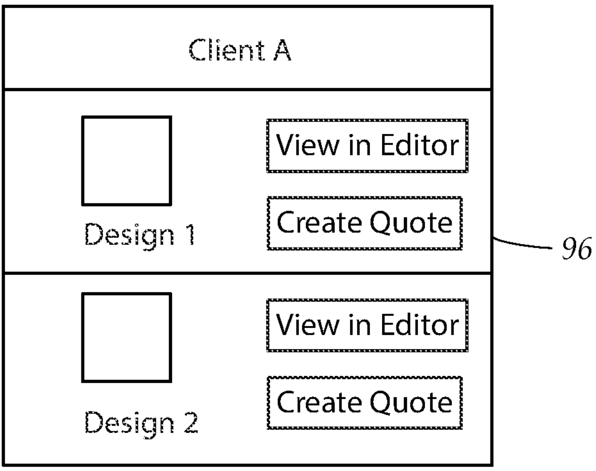
FIG. 9B is a diagrammatical representation of a list of customized layouts within a quote management interface, in accordance with an embodiment in the present disclosure.

Referring to FIG. 7F and FIG. 6A while also referring to FIGS. 1B-C and FIG. 3B, structural components 84 are combined together to form a support frame 80F, such as a kitchen island or peninsula. A support frame 80F corresponds to a cabinet or similar apparatus comprising multiple structural components 84 which support a horizontally disposed top component 88. The structural components 84 may correspond to metal or wood panels, bricks, or other materials suitable for use in the construction of cabinets, and the product metadata 68 may include a subtype which identifies the material properties of the structural components 84. Top components 88 correspond to countertops, tabletops, or other horizontally disposed planar surfaces which serve as a food preparation surface, and upon which items may be placed and appliances 82 may be installed. Each support frame 80F has a plurality of placement surfaces 90 which are either horizontally or vertically oriented, upon which virtual components 60 which represent appliances 82 may be placed.

Figure 3C:
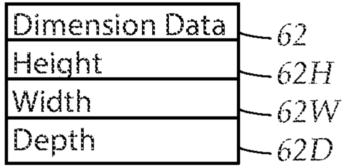
FIG. 3C is a diagram depicting dimension data categories, in accordance with an embodiment in the present disclosure.
Figure 3D:
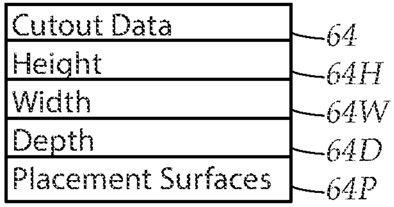
FIG. 3D is a diagram depicting exemplary cutout data categories, in accordance with an embodiment in the present disclosure.

Referring to FIGS. 3C-3D and FIG. 6B while also referring to FIGS. 1B-C and FIGS. 3A-B, the dimension data 62 of each virtual component 60 represent a set of physical measurements which allow the physical component which the virtual component 60 represents to be accurately modeled within the virtual design space 54. For example, the dimension data 62 may comprise a height 62H, a width 62W, and a depth 62D. Similarly, the cutout data 64 represents an intersection between the virtual component 60 and one of the placement surfaces 90, forming a void space into which the virtual component 60 may be placed, thus allowing the virtual component 60 to integrate with the support frame 80F. In one embodiment, the cutout data 64 comprises a height 64H, a weight 64W, and a depth 64D which indicate the dimensions of the intersection between the virtual component 60 and the placement surface 90. The cutout data 64 may also comprise placement surface data 64P. In one embodiment, the placement surface data 64P identifies a planar orientation which indicates whether the virtual component 60 is oriented along a horizontal plane or a vertical plane. The placement surface data 64P may also identify a cutout shape which corresponds to the shape of the void space into which a virtual component 60 is to be installed.

Turning to FIG. 5A, FIG. 6B, and FIG. 7F while also referring to FIGS. 1A-C and FIGS. 3A-B, the virtual design interface 50 is adapted to automatically generate a support frame 80F within the virtual design space 54 using user-defined inputs including a perimeter shape 80P, perimeter dimensions 80PD, and frame materials selection 84 MS. For illustrative purposes, an example support frame 80F is depicted (in FIG. 7F) in an exploded view to better illustrate the structural components 84 which can form the support frame. The perimeter shape 80P represents the appearance of the support frame 80F when seen from above, and may be divided between a plurality of perimeter sides 80PS. For example, the perimeter shape 80P may be straight, L-shaped, or U-shaped. In certain embodiments, the perimeter shape 80P may incorporate perimeter sides 80PS which are substantially flat or arcuate in shape. The perimeter dimensions 80PD may include overall physical dimensions for the support frame 80F such as height, length, and width, and may also include lengths of each of the perimeter sides 80PS.

Each support frame 80F has at least one horizontal face 88S, and one or more vertical faces 81 arranged in a configuration determined by the perimeter sides 80PS. Each vertical face 81 is formed by one or more structural components 84, while the horizontal face 88S is formed by one or more top components 88. Each horizontal face 88S is a potential placement surface 90 for a horizontally oriented virtual component 60, while each vertical face 81 is a potential placement surface 90 for a vertically oriented virtual component 60. In one embodiment in which there are at least four perimeter sides 80PS, the vertical faces 81 comprise a first end 81A, a second end 81B, at least one inner vertical surface 81C, and at least one outer vertical surface 81D.

The virtual design interface 50 also allows the user 24 to input the frame material selection 84MS, which defines one or more materials with which the support frame 80F will be formed or constructed. For example, the frame material selection 84MS may specify that wood components will be used to form the support frame 80F. Alternatively, the frame material selection 84MS may be deferred until later on in the customization process. The design module 30 is configured to automatically select the structural components 84 which will form the support frame 80F based on the frame material selection 84MS, and arrange the structural components 84 in accordance with the perimeter shape 80P. For example, if the frame material selection 84MS corresponds to wood materials, the design module 30 may automatically select structural components 84 formed of wood panels, and automatically configure the structural components 84 to form the perimeter shape 80P. Each perimeter side 80PS may be formed using one or more structural components 84. For example, if the frame material selection 84MS corresponds to brick or stone, the design module 30 may automatically allocate individual structural components 84 to form the perimeter shape 80P based on the perimeter dimensions 80PD and the physical dimensions of each structural component 84. In other embodiments where the frame material selection 84MS identifies materials which lack predefined physical dimensions, or when the user 24 declines to specify the material, the design module 30 may instead model the support frame 80F in a generalized format in accordance to the perimeter dimensions 80PD and perimeter shape 80P.

Referring to FIG. 6A while also referring to FIG. 1A-C, FIG. 3B, and FIGS. 5A-D, once the user-inputs have been defined, the design module 30 displays a virtual representation of the support frame 80F positioned upon the virtual surface 54S within the graphical preview 52. The structural components 84 which form the support frame 80F are arranged in the selected perimeter shape 80P. In the illustrated example, the support frame 80F has an L-shaped perimeter shape 80P, with an overall length and width of twelve feet respectively. The vertical faces 81 of the support frame 80F comprise two inner vertical surfaces 81C and two outer vertical surfaces 81D, as well as a first end 81A and a second end 81B.

The virtual design interface 50 also allows the user to select the top component 88 which forms the horizontal surface 88S of the support frame 80F. In one embodiment, the component selection interface 56 may allow the user 24 to choose a virtual component 60, such as a countertop 88C, which will be placed within the virtual design space 54.

The design platform 10 also allows the user 24 to view, select, and place appliances 82 upon the support frame 80F using graphical tools provided within the virtual design interface 50. The virtual design tools 54D allow the user to view and select an appliance 82 from the component library 34, and then place a virtual component 60 representing the selected appliance 82 upon the support frame 80F. In one embodiment, the user 24 may select a type 68T of virtual component 60, whereupon the component selection interface 56 will display a list of virtual components 60 of the selected type 68T. In one example, the user 24 may choose to view appliances 82 of the "grill" type 68T, and the component selection interface 56 populates the component list 56L with grills organized by model 68L. In the present example, the models 68L denote different sizes of grill. Once the user 24 selects one of the models, the component selection interface 56 may prompt the user 24 to select a brand 68B. For example, the user 24 may be presented with a list of brands which offer grills with a size of thirty-two inches. After selecting one of the brands, the user 24 may be presented with a list of grills described by name and price.

Note that the component list 56L within the component selection interface 56 may be used to filter and sort appliances 82 or other virtual components 60 using a combination of any of the characteristics within the product metadata 68. For example, the user 24 may choose to view components with a combination of characteristics including type 68T, manufacturer 68M, model 68L, and price 68P.

Figure 5D:
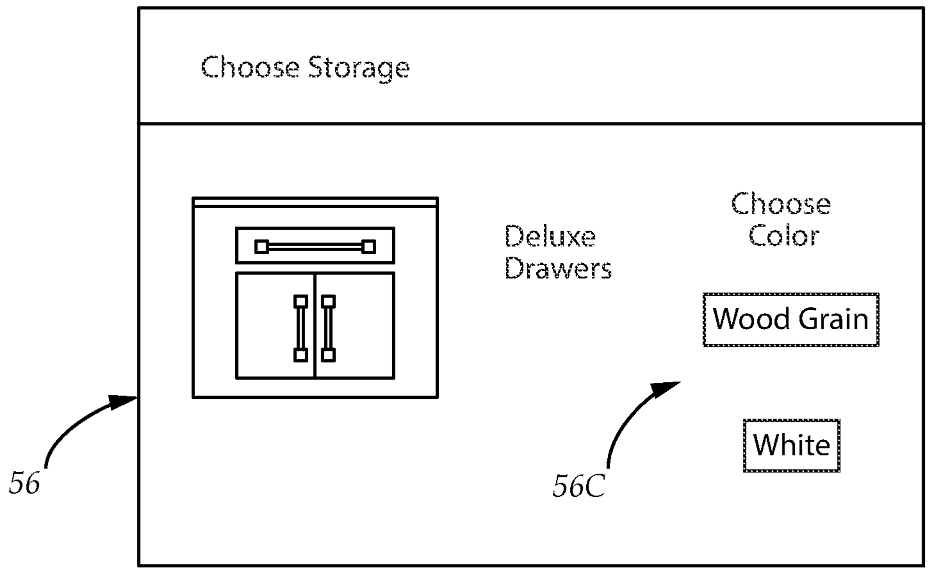
FIG. 5D is a diagrammatic representation of component customization options allowing the user to specify aesthetic characteristics for the selected appliance, in accordance with an embodiment in the present disclosure.

Upon the user 24 selecting a specific virtual component 60, the component selection interface 56 may then allow the user 24 to view and select one or more customization options 56C as described by the optional configuration data 70 associated with the selected virtual component 60. For example, as shown in FIG. 5D, the selected virtual component 60 may have a customizable aesthetic characteristic such as color or finish. In the example illustrated, the user 24 has selected a virtual component 60 representing a set of drawers which is available in two color customization options 56C.

Referring to FIG. 6A-B while also referring to FIGS. 1A-C and FIG. 3E, once the user 24 has selected a virtual component 60, the virtual design interface 50 will allow the user to 24 to place the virtual component 60 upon the support frame 80F. In one embodiment, the virtual design interface 50 and the design tools 56 form a placement interface which facilitate the placement, repositioning, and editing of the selected virtual component 60.

The design module 30 reads the planar orientation of the selected virtual component 60 in order to identify the potential placement surfaces 90 upon which the virtual component 60 may be installed. For example, storage appliances such as drawers are oriented vertically and may be installed along one of the vertical faces 81 of the support frame, while sinks, grills, and burners are oriented horizontally and may be installed along one of the horizontal faces 88S. Therefore, each vertical face 81 may correspond to a vertical placement surface 90V, and each horizontal face 88S may correspond to a horizontal placement surface 90H. In some embodiments, the potential placement surfaces 90 which match the planar orientation of the selected virtual component 60 may be highlighted or otherwise visually distinguished upon the graphical representation of the support frame 80F within the graphical preview 52.

Next, the design module 30 determines whether the physical characteristics of the selected virtual component 60 will allow the virtual component to be properly installed upon the potential placement surfaces 90. The design module 30 compares the dimension data 62 and the cutout data 64 of the selected virtual component 60 with the dimensions of each vertical face 81 or horizontal face 88S which forms each of the potential placement surfaces 90, to determine if a potential placement point exists upon the potential placement surfaces 90. Each potential placement point represents a location upon the support frame 80F upon which an appliance 82 may be properly installed. In a preferred embodiment, potential placement points which have been identified are displayed within the graphical preview 52 as placement point previews 92 which are visually marked upon the virtual representation of the support frame 80F.

Each vertical face 81 has a vertical face height 81H and a vertical face width 81W. Furthermore, each vertical face 81 has vertical face depth 81DP which extends inwardly into the support frame 80F away from the vertical face 81. Similarly, each horizontal face 88S has a horizontal face width 88W, a horizontal face length 88L, and a horizontal face depth 88DP. The cutout data 64 of the selected virtual component 60 represents the physical space occupied by the corresponding appliance 82 along the corresponding vertical placement surface 90V or horizontal placement surface 90H, as appropriate. In one embodiment, the design module 30 reads the dimension data 62, expressed as a cutout height 64H and cutout width 64W, to determine if the selected virtual component 60 can be properly positioned upon the placement surface 90. If the dimensions within the cutout data 64 do not exceed the dimensions of the placement surface 90, the selected virtual component 60 may be properly positioned upon the placement surface 90, and a placement point preview 92 is displayed upon the corresponding placement surface 90.

Figures 6C, 6D:
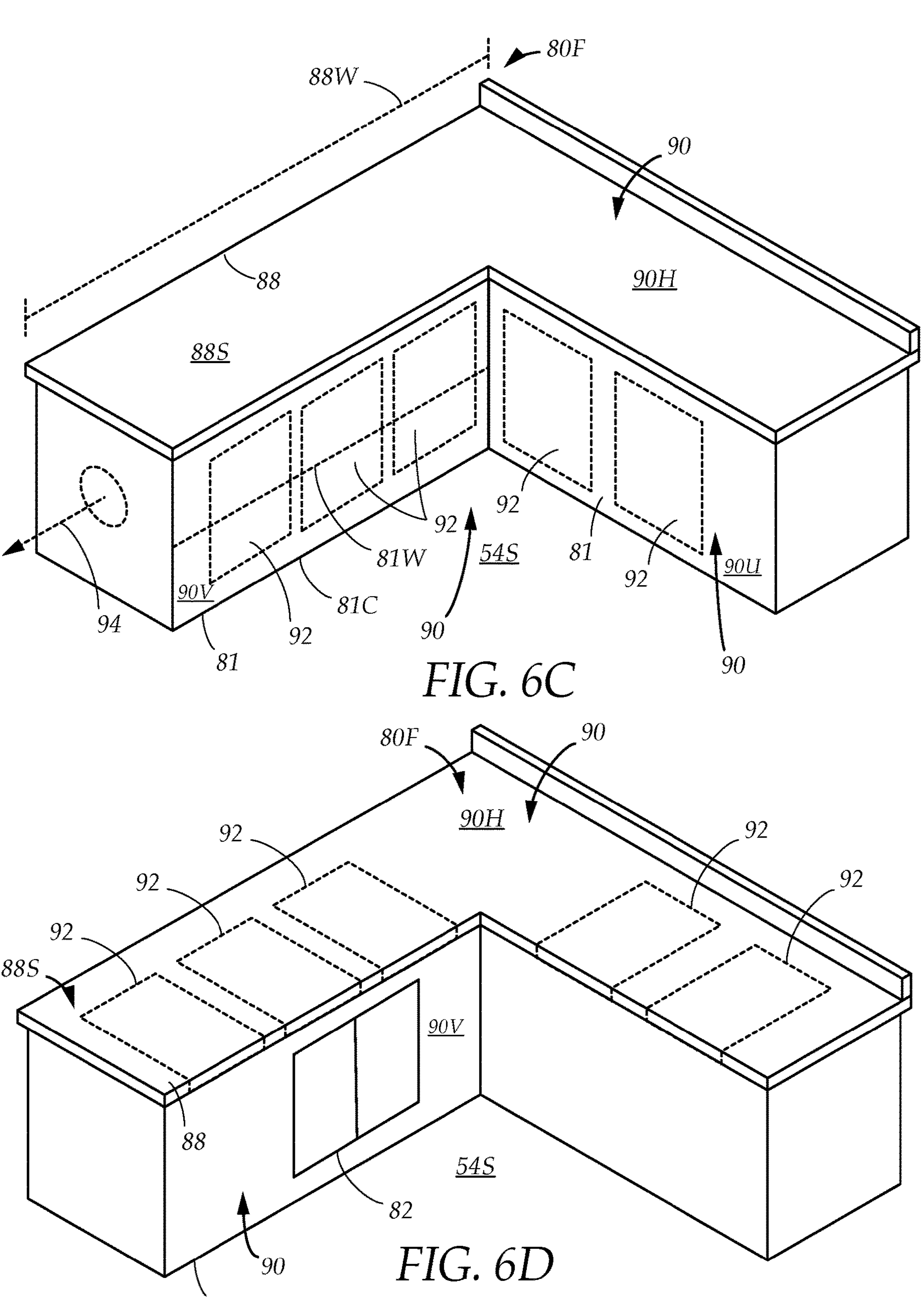
FIG. 6C is a diagrammatic perspective view of the support frame, showing a dimension adjustment control, in accordance with an embodiment in the present disclosure.
FIG. 6D is a diagrammatic perspective view of the support frame with a vertically oriented appliance positioned thereon, in accordance with an embodiment in the present disclosure.

Referring to FIGS. 6C-D while also referring to FIG. 5A, FIGS. 6A-B, FIGS. 1A-C, and FIG. 3E, where multiple potential placement points have been identified, the design module 30 may display a placement point preview 92 superimposed over each potential placement point across each valid placement surface 90. Furthermore, if the dimensions of the placement surface 90 allow multiple potential placement points to be positioned thereon, the design module 30 will display a placement point preview 92 over each of the potential placement points which have been identified upon the placement surface 90. For example, the support structure 80F may have two vertical faces 81 each corresponding to a vertical placement surface 90V. The vertical face width 81W of each vertical placement surface 90V may be sufficient to allow two potential placement points to be positioned upon each of the vertical placement surfaces 90V. Therefore, a total of four placement point previews 92 may be displayed upon the support frame 80F within the graphical preview 52.

In a preferred embodiment, the design tools 54D may further provide one or more dimension adjustment controls 94 which allow the user 24 to adjust the perimeter dimensions 80PD within the graphical preview 52. For example, the dimension adjustment controls 94 may allow the user 24 to dynamically adjust the dimensions of the horizontal or vertical placement surfaces 90H, 90V by resizing the underlying structural components 84 of the support frame 80F. In certain embodiments, the dimension adjustment controls 94 may be used to adjust the height, width, or depth of any of the structural components 84 or top components 88 of the support frame 80F. Such adjustments may be performed directly upon the visual representation of the support frame 80F. For example, the user 24 may use the dimension adjustment controls 94 to extend the vertical face width 81W of one of the vertical placement surfaces 90V, along with the horizontal face width 88W of the corresponding horizontal placement surface 90H positioned above the vertical placement surface 90V.

In response to the adjustments to the perimeter dimensions 80PD, the design module 30 may continuously reidentify the potential placement points and repopulate the placement point previews 92 within the graphical preview, in accordance with the adjusted perimeter dimensions 80PD. In the present example, the adjusted vertical face width 81W may allow the adjusted vertical placement surface 90V to accommodate an additional potential placement point for the selected virtual component 60, causing the design module 30 to display three placement point previews 92 upon the vertical placement surface 90V.

In another example, the user 24 may select a virtual component 60 which has cutout dimensions which exceed the dimensions of all the corresponding placement surfaces 90. The dimension adjustment controls 94 therefore allow the user 24 to adjust the perimeter dimensions 80PD until the placement surface 90 is sufficiently large to accommodate the selected virtual component 60.

The virtual design interface 50 allows the user 24 to place the selected virtual component 60 upon the support frame 80F by selecting one of the placement point previews 92, causing the design module 30 to display a graphical representation of the corresponding appliance 82 within the graphical preview 52 which replaces the selected placement point preview 92.

In a preferred embodiment, the graphical representation of the appliance 82 reflects any aesthetic characteristics or other component customization options which have been chosen for the selected virtual component 60. Furthermore, the graphical representation of the support frame 80F will also reflect any aesthetic characteristics of the structural components 84 as well as the top component 88. For example, the vertical faces 81 of the support frame 80F may be displayed with the appearance of red bricks, while the top component 88 may be displayed with the appearance of a steel countertop.

The visual design interface 50 may further allow the user 24 to select, edit one, or delete of the virtual components 60 within the graphical preview 52. The design tools 54D may allow the user 24 edit the selected virtual component 60 by repositioning it to a location marked by another placement point preview 92. Alternatively, the visual design interface 50 may provide a repositioning tool which allows the user 24 to manually reposition the selected virtual component 60 along the corresponding placement surface 90 using a drag and drop function. The virtual component 60 may be repositioned vertically or horizontally where appropriate in accordance to the planar orientation thereof. For example, a virtual component 60 positioned upon the vertical placement surface 90V may be repositioned both horizontally and/or vertically within the boundaries of the vertical placement surface 90V.

The visual design interface 50 may also allow the user 24 to clone the selected virtual component 60 by placing another instance of the component within another placement point preview 92 displayed within the graphical preview 52. The user 24 may also be allowed to choose alternative optional configurations for the selected virtual component 60, which are reflected within the graphical preview 52 accordingly.

The design tools 54D may also allow the user 24 to replace the selected virtual component 60 with a different virtual component 60. For example, the user 24 may be allowed to select another virtual component 60 which shares the same type 68T, but which has a different model 68L, brand 68B, or manufacturer 68M.

Referring to FIGS. 7B-D while also referring to FIGS. 1A-C, FIG. 3B, and FIGS. 6A-D, in a preferred embodiment, the design module 30 will prevent the selected virtual component 60 from intersecting with another virtual component 60 representing an appliance 82 which has already been positioned upon the support frame 80F. As such, placement point previews 92 will not be positioned in a location which intersects with another virtual component 60 representing an existing positioned appliance 82, nor will the virtual design module 30 allow the user 24 to manually reposition the selected virtual component 60 to intersect with the existing positioned appliance 82. In certain embodiments, the design module 30 may surround the cutout 63 of each virtual component 60 representing an appliance with a buffer space which extends the dimensions of the virtual appliance 60 for purposes of detecting an improper intersection, such as with an existing positioned appliance 82. In certain embodiments, the buffer space may be dictated by the physical shape of the appliance which the virtual component 60 represents. For example, a portion of the appliance 82 may extend horizontally or vertically beyond the boundaries of the cutout 63 defined by the component data 60D.

Referring to FIGS. 7A-D while also referring to FIGS. 1A-C, each vertical face 81 has a vertical boundary 81BD, and each horizontal face 88S has a horizontal boundary 88BD. The vertical boundary 81BD and the horizontal boundary 88BD may represent physical edges or sides of the underlying structural component 84. As such, the design module 30 may detect and prevent an impermissible intersection between the cutout 63 of any virtual component 60 and the vertical boundary 81BD or the horizontal boundary 88BD of the vertical or horizontal placement surface 90V, 90H where appropriate.

Referring to FIGS. 7A-D while also referring to FIGS. 6D, FIGS. 1A-C, and FIG. 3E, in certain embodiments, the cutout data 64 of a virtual component 60 may indicate that the corresponding appliance 82 intersects one of the horizontal placement surfaces 90H as well as one of the vertical placement surfaces 90V adjoined thereto. The vertical placement surface 90V and the horizontal placement surface 90H may share a common edge 85 which joins the two placement surfaces 90. For example, the selected virtual appliance 60 may be a grill which is principally positioned in a horizonal planar orientation along the horizontal placement surface 90H. However, a portion of the grill may intersect the vertical face 81 which shares a common edge 85 with and is positioned directly below the top component 88. Therefore, the cutout shape 63S of the selected virtual component 60 may intersect both the horizontal placement surface 90H defined by the top component 88 and the vertical placement surface 90V defined by the vertical face 81.

To ensure correct identification of potential placement points and proper placement of the virtual component 60, the design module 30 will ensure that the cutout shape 63S of the selected virtual component does not cause an improper intersection with the vertical and horizontal boundaries 81BD, 88BD of the associated placement surfaces 90 except at the common edge 85, or with an existing positioned appliance 82.

Turning to FIG. 1C and FIG. 7E while also referring to FIG. 5A, a graphical representation of an exemplary food preparation structure 80 is shown within the graphical preview 52 from a perspective view and a top view. The customized layout shown here has a support frame 80F formed in an L-shaped perimeter shape 80P. Two horizontally oriented appliances 82-*a* grill and a sink, are positioned upon the countertop 88C, while two vertically oriented appliances including a storage drawer and a refrigerator, are positioned within vertical faces 81 forming the support frame 80F. The graphical preview further reflects the visual appearance of the customized layout, including color options of the appliances 82, as well as the appearance of the countertop 88C as determined by its material composition, and the appearance of the vertical faces 81 as determined by the frame material selection 84MS.

Turning to FIG. 8, FIGS. 7A-C, and FIG. 7F while also referring to FIGS. 1A-C, FIG. 5A, and FIG. 3E, the design platform 10 stores the customized layout as customization data 71 stored within the platform data store 40. The customization data 71 is further associated with the user profile 42U of the user 24. The customization data 71 embodies all the information necessary to recreate the support frame 80F and the selected virtual components 60 in accordance with the customizations defined by the user 24 via the virtual design interface 50. In one embodiment, the customization data 71 contains support frame data 80FD which embodies the perimeter shape 80P and the perimeter dimensions 80PD, along with the frame material selection 84MS.

The support frame data 80FD may further contain structural component data 84D which identifies each structural component 84 which forms the support frame 80F, as well as top component data 88D which identifies each top component 88 placed upon the support frame 80F. The support frame data 80FD may further contain spatial position data 62S which defines the relative position and orientation of each structural component 84 and top component 88 within the support frame 80F. The spatial position data 62S may also orient the support frame 80F and/or the virtual component 60 relative to the virtual surface 54S and the X, Y, and Z axes 54X, 54Y, 54Z. In one embodiment, the customization data may be stored in a format similar to those utilized by three dimensional graphical or computer aided design software.

The structural component data 84D and the top component data 88D further define customized physical dimensions of the associated structural component 84D and top component 88 respectively. Therefore, the support frame data 80FD allows the design module 30 to recreate the customized layout by identifying each structural component 84 and top component 88, the customized physical dimensions of each such component, and the relative position and orientation of each component within the support frame.

The customization data 71 further contains sufficient data to allow the design module 30 to position upon the support frame 80F each of the appliances 82 selected and placed by the user 24. The customization data 71 may therefore contain appliance data 82D which identifies each virtual component 60 representing an appliance 82 which was placed by the user 24, along with spatial positioning data 64A identifying the placement surface 90 or surfaces upon which each virtual component 60 was placed, and the relative position and orientation of the virtual component 60 with respect thereto.

To facilitate fabrication and/or assembly of the physical components required to construct the support frame 80F, the design platform 10 further allows one or more graphical output templates 72F to be generated using the customization data 71. In one embodiment, the output module 36 is adapted to read the customization data 71 and generate two-dimensional graphical output containing the physical dimensions of each structural component 84 or top component 88, as well as a layout which identifies the relative position of the components in relation to the structural frame 80F. The graphical output template 72F forms a blueprint or schematic which allows a craftsman to fabricate and assemble the individual components to construct a food preparation structure 80 in accordance with the customized layout. For example, the graphical output may include top, front, rear, or side views of the structural components 84 along with the physical dimensions of each component, as well as top, front, rear, or side views of the support frame 80F which show the perimeter shape 80P and the relative position and orientation of each structural component 84 and appliance 82. The graphical output may be printed or viewed electronically. Various software libraries exist which facilitate conversion of three dimensional design data and metadata contained into a two dimensional graphical output format, such as in PDF format. In one embodiment, the conversion capabilities of the output module 36 may be implemented using such libraries, as will be apparent to a person of ordinary skill in the art. Furthermore, the output module 36 may further be adapted to read and convert the graphical output to restore the customization data 71, allowing the design module 30 to recreate the customized layout within the virtual design interface 50.

Referring to FIGS. 7A-C while also referring to FIG. 8, FIG. 3E, and FIGS. 1A-C, the output module 36 is further adapted to generate a cutout template 72C for each of the virtual components 60 representing appliances 82 within the customized layout. Each cutout template 72C is stored within the platform data store 40 and is accessible by the user 24 who created the associated customized layout. In one embodiment, the cutout template 72C overlays the cutout shape 63S of the virtual component 60 over the corresponding placement surface 90. The output module 36 may use spatial positioning data 64A associated with the virtual component 60 to orient the cutout shape 63S. In one embodiment, the spatial positioning data 64A may include vertical offsets 81ST or horizontal offsets 88ST which orients the cutout shape 63S in relation upon the vertical placement surface 90V or the horizontal placement surface 90H as appropriate. The cutout template 72C allows the craftsman to create the void upon the support frame 80F in accordance with the cutout shape 63S to facilitate installation of the physical appliance represented by the virtual component 60.

In one embodiment, the design platform 10 may allow one of the provider users 24P to access the graphical output templates 72F and cutout templates 72C of a particular customer user 24C. Furthermore, the design platform 10 allows the customer user 24C to download the graphical output templates 72F and cutout templates 72C, thus enabling the customer to procure or fabricate the structural components 84, assemble the support frame 80F, and install the appliances without the aid of a provider.

Turning to FIGS. 9A-B, FIG. 9D, and FIG. 10 while also referring to FIGS. 1A-C, and FIG. 3E, the quote management module 39 allows the provider users 24P to view the customized layouts created by the customer users 24, and submit a quote 74 associated with the customized layout. In one embodiment, the quote management module 39 generates a quote management interface 96 viewable via the user device 18. The quote management module 39 may also allow the provider user 24P to select one of the customized layouts and view the customized layout within the virtual design interface 50. In certain embodiments, the provider user 24P may also be allowed to edit the customized layout.

The quote management module 39 may further generate a design summary 97 which describes the dimensions and materials of the support frame 80F and the top component 88, along with the quantity, type, and other details regarding the appliances 82 within the customized layout. The design summary 97 may also generate a materials price estimate 98 by utilizing the pricing data 68P of each of the structural components 84, top components 88, appliances 82, and other relevant virtual components embodied within the customized layout. The quote management module 39 will allow the provider user 24P to submit a quote 74 with a quote price for the customized layout. The quote price represents a monetary value charged by the provider for the installation of a food preparation structure 80 which embodies the customized layout. The quote price may also include the cost of the associated materials and appliances.

Turning to FIG. 9C and FIG. 9E while also referring to FIG. 10 and FIGS. 1A-C, the quote management interface 96 may present the customer user 24C with a list of quotes 74 submitted by the provider users 24P. The quote management interface 96 further allows the customer user 24C to select and accept one of the quotes 74.

Figure 4:
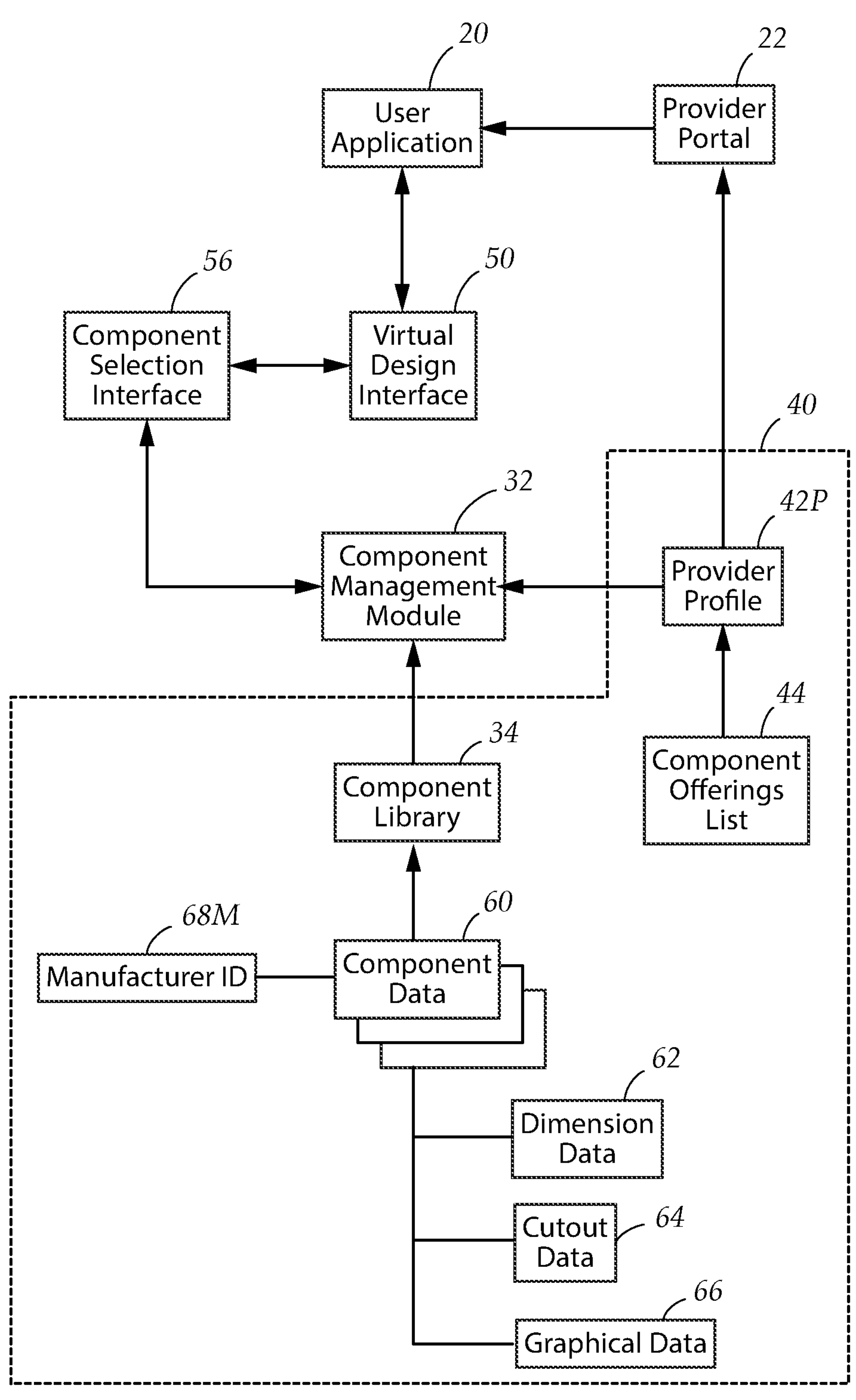
FIG. 4 is a block diagram depicting the component management module executing a filtering operation using a component offerings list when the virtual design interface is accessed via a provider portal, in accordance with an embodiment in the present disclosure.

Turning to FIG. 4 while also referring to FIGS. 1A-C and FIGS. 3A-B, the design platform 10 may allow access by users 24 to the virtual design interface 50 through provider portals 22. In one embodiment, a provider portal 22 may be an embedded object within a website associated with one of the providers, which allows a customer user 24C to access the virtual design interface 50. In certain embodiments, the provider portal 22 may be implemented as a rebranded variant of the user application 20 which provides substantially the same functionality as the standard user application 20. For example, a rebranded variant of the user application 20 may display the name and/or logos of a particular manufacturer or retailer.

The component management module 36 may allow each provider user 24P to create a component offerings list 44 which is then associated with the provider user profile 42P. The component offerings list 44 allows the provider to define a customized list of virtual components which reflect appliances, structural components, or other parts which are sold, distributed, or utilized by the provider. For example a provider which is a manufacturer may offer only unbranded components along with the virtual components 60 which are manufactured by the provider.

As such, if a customer user 24C accesses the virtual design interface 50 through the provider portal 22, the component management module 36 may cause the component selection interface 56 to display only those virtual components 60 which are reflected in the component offerings list 44 of the associated provider.

Figure 10:
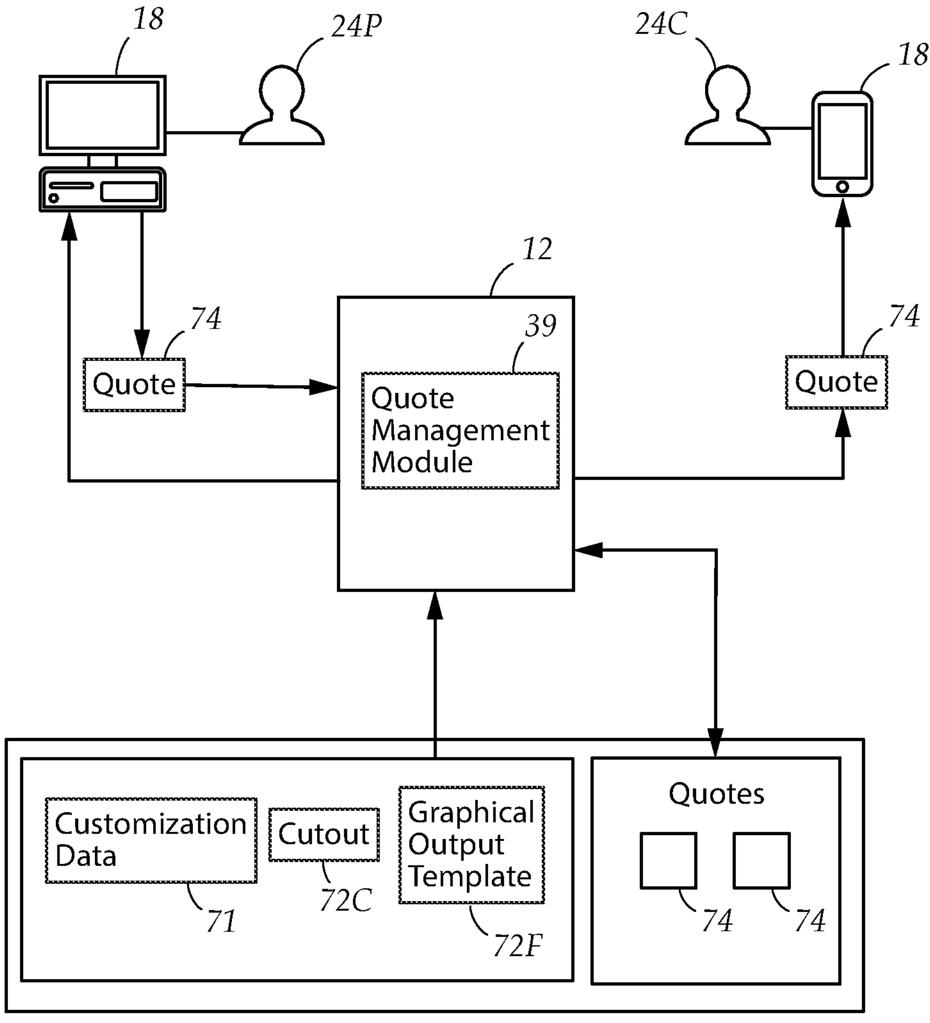
FIG. 10 is a block diagram depicting a quote management module in operation, in accordance with an embodiment in the present disclosure.

Referring to FIG. 10 while also referring to FIG. 4 and FIG. 1A, in one embodiment, the quote management module 39 may allow a first provider associated with a quote 74 which has been accepted by the customer user 24C to designate a second provider using the design platform 10. The second provider is tasked with performing the installation of the food support structure at a worksite designated by the customer user 24C, in accordance with the customized layout. For example, the first provider may represent a manufacturer which sells materials and appliances, and the second provider may represent a contractor which will perform the installation.

Referring to FIGS. 1A-C, in certain embodiments, the user device 18 may correspond to, or operate in conjunction with, a virtual reality display device 19V. The user application 20 may cause the virtual design interface 50 to be displayed through the virtual reality device 19V. In certain embodiments, the user device 18 may operate in conjunction with a camera 18C, and the design module 30 may allow the virtual design interface to be overlaid with image data produced by the camera 18C to create an augmented reality display.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented an outdoor kitchen design platform. The disclosure is illustrated by example in the drawing figures, and throughout the written description. It should be understood that numerous variations are possible, while adhering to the inventive concept. Such variations are contemplated as being a part of the present disclosure.

What is claimed is:

1. A design platform, comprising:

a plurality of user devices each having a device screen and an input device;

a control server configured to communicate with the plurality of user devices via a data communication network, the control server maintains a platform data store, the platform data store containing user data associated with a plurality of users comprising customer users and provider users, each provider user is associated with a provider corresponding to a manufacturer, distributor, or contractor;

a user application which is executed on the user devices or which is implemented as a web application accessible via the user devices, the user application allows the users to access the design platform;

a component library stored within the platform data store, the component library having a plurality of component data each representing a virtual component, the virtual components comprising a plurality of appliances and structural components, the component data of each appliance further has classification metadata including type and model, and placement data;

a design module implemented by the control server which allows one of the customer users to generate a customized layout, the design module generates a three dimensional virtual design space containing a horizontally disposed virtual surface, and provides a virtual design interface accessible by the users via the user application, the virtual design interface has a graphical preview and design tools which allow one of the customer users to define a perimeter shape formed from a plurality of perimeter sides, and perimeter dimensions describing the perimeter shape and the perimeter sides, the design module generates a support frame for the customized layout within the graphical preview, the support frame projects from the virtual surface and has a plurality of vertical faces aligned with the perimeter sides and a horizontal face positioned above the vertical faces which is defined by the perimeter shape;

a component selection interface within the virtual design interface, the component selection interface presents the customer user with a component list displaying the virtual components representing appliances within the component library, the component selection interface allows the customer user to sort the virtual components by appliance type or model, and select one of the virtual components;

a placement interface within the virtual design interface, the placement interface defines one or more placement surfaces upon the support frame corresponding to the horizontal face or one of the vertical faces, and allows the customer user to add the selected virtual component to the customized layout by placing the selected virtual component upon one of the placement surfaces within the graphical preview, causing the graphical preview to display a graphical representation of the virtual component upon the placement surface;

customization data generated by the design module which embodies the customized layout and is stored within the platform data store; and a quote management module implemented by the control server, the quote management module implements a quote management interface which allows the provider users to view the customized layout of the customer user via one of the user devices, and generate a quote containing a quote price for installation of a food preparation structure embodying the customized layout, the quote management interface further presents the customer user with each of the quotes, and allows the customer user to select and accept one of the quotes.

2. The design platform as described in claim 1, wherein:

the placement data for each virtual component representing one of the appliances contains planar orientation and cutout dimensions, the planar orientation describes whether the appliance is horizontally or vertically oriented, and the cutout dimensions define an intersection between the virtual component and the support frame when the virtual component is properly positioned thereon; and the placement interface reads the planar orientation of the selected virtual component, and identifies either the horizontal surface or one of the vertical faces as one of the placement surfaces in accordance with the planar orientation.

3. The design platform as described in claim 2, wherein:

each placement surface has dimensions defined by the perimeter dimensions, the placement interface identifies potential placement points upon each of the placement surfaces by comparing the cutout dimensions to the dimensions of placement surface, and visually displaying a placement point preview upon each placement surface which accommodates the cutout dimensions of the selected virtual component, the placement interface further allows the selected virtual component to be placed upon one of the potential placement points marked by one of the placement point previews.

4. The design platform as described in claim 3, wherein:

the placement interface further contains a dimension adjustment control which allows the customer user to modify the perimeter dimensions and resize the placement surfaces within the virtual design interface, the placement interface further reidentifies and repopulates the placement point previews for the selected virtual component in real time according to the adjusted dimensions of each placement surface.

5. The design platform as described in claim 4, wherein:

the placement interface has a repositioning tool which allows the customer user to reposition the selected virtual component along the placement surface, the placement interface prevents the repositioned virtual component from intersecting with an existing positioned appliance already in place upon the support frame.

6. The design platform as described in claim 5, wherein:

the design module allows the customer user to define a frame material selection, and the design module generates the vertical faces of the support frame using structural components matching the frame material selection; and the placement interface allows the customer user to define a top component which forms the horizontal face.

7. The design platform as described in claim 6, wherein:

the classification metadata for each virtual component further contains attribution data, and pricing data;

the component selection interface allows the customer user to sort the virtual components according to the attribution data; and the quote management module generates a materials price estimate for the customized layout based on the pricing data of each structural component, top component, and appliance embodied therein.

8. The design platform as described in claim 7, further comprising:

a provider portal which allows the customer user to access to the virtual design interface via a provider website associated with one of the providers; and a component management module implemented by the control server, the component management module implements a component offerings list associated with one of the providers which identifies the virtual components offered by the provider, the component management module filters the component list generated by the component selection interface according to the corresponding component offerings list when the customer user accesses the virtual design interface via the provider portal.

9. The design platform as described in claim 7, further comprising:

an output module adapted to export the customization data as a two dimensional graphical output for storage within the platform data store, the customization data containing support frame data describing the perimeter shape, the perimeter dimensions, the frame material selections of the support frame, and the top component, the customization data further contains appliance data identifying each virtual component within the customized layout and contains spatial positioning data identifying the placement surface upon which the virtual component was placed and the relative position and orientation of the virtual component upon the placement surface, the graphical output forming a graphical output template which facilitates installation and assembly of the food support structure in accordance with the customized layout.

10. The design platform as described in claim 9, wherein:

the output module is further adapted to generate a cutout template for each of the virtual components within the customized layout, the output module uses the cutout dimensions of the virtual component and the associated spatial positioning data to place the cutout template upon the placement surface associated with the virtual component, the cutout template defining the void to be formed in the placement surface to allow installation of the appliance; and the quote management module allows one of the provider users and the customer user to access the two dimensional graphical output and the cutout templates associated with the customized layout.

11. A method for designing an outdoor kitchen, comprising the steps of:

providing a design platform comprising a control server, a platform data store, and a quote management module and a design module implemented by the control server, the design platform having a plurality of users including customer users and provider users, each provider user is associated with a provider corresponding to a manufacturer, distributor, or contractor;

providing a user application executed on a plurality of user devices in communication with the control server via a data communication network;

maintaining a component library stored within the platform data store, the component library having a plurality of component data each representing a virtual component, the virtual components comprising a plurality of appliances and structural components, the component data of each appliance further has placement data, and classification metadata including type and model;

initiating the user application by one of the customer users via the user device, the user device presenting the customer user with a virtual design interface having design tools and a graphical preview, the graphical preview displaying a three dimensional virtual design space with a horizontal virtual surface generated by the design module;

creating a customized layout and defining a perimeter shape and perimeter dimensions by the customer user via the design tools;

generating a support frame within the graphical preview upon the virtual surface by the design module in accordance with the perimeter dimensions and the perimeter shape, forming a plurality of vertical faces aligned with the perimeter sides, forming a horizontal face positioned above the vertical faces defined by the perimeter shape;

displaying a component selection interface within the virtual design interface, presenting the customer user with a component list displaying the virtual components representing the appliances within the component library, and filtering the component list using the classification metadata;

selecting one of the virtual components by the customer user;

displaying a placement interface within the virtual design interface, the placement interface identifying one or more placement surfaces upon the support frame corresponding to the horizontal face or one of the vertical faces;

adding the selected virtual component to the customized layout, the customer user placing the selected virtual component upon one of the placement surfaces within the graphical preview using the placement interface, the graphical preview displaying a graphical representation of the virtual component upon the placement surface of the support frame;

saving the customized layout as customization data within the platform data store;

displaying a quote management interface within the user application by the quote management module, viewing the customized layout by one or more of the provider users, and generating a quote by one or more of the provider users each containing a quote price for installation of a food preparation structure embodying the customized layout; and viewing the quotes by the customer user via the quote management interface, and selecting and accepting one of the quotes by the customer user.

12. The method as recited in claim 11, wherein:

the placement data for each virtual component representing one of the appliances contains planar orientation and cutout dimensions, the planar orientation describes whether the appliance is horizontally or vertically oriented, and the cutout dimensions define an intersection between the virtual component and the support frame when the virtual component is properly positioned thereon; and the step of displaying a placement interface further comprises the placement interface identifying one or more placement surfaces upon the support frame which match the planar orientation of the selected virtual component.

13. The method as recited in claim 12, wherein:

the step of displaying a placement interface is followed by the step of identifying potential placement points upon the one or more placement surfaces by comparing the cutout dimensions of the selected virtual component to dimensions describing the placement surface as defined by the perimeter dimensions, and visually displaying a placement point preview upon each placement surface which accommodates the cutout dimensions of the selected virtual component; and the step of adding the selected virtual component to the customized layout further comprises the customer user placing the selected virtual component upon one of the placement point previews displayed on the placement surfaces within the graphical preview using the placement interface.

14. The method as recited in claim 13, wherein:
the step of identifying potential placement points is followed by the step of presenting a dimension adjustment control within the placement interface, modifying the perimeter dimensions and resizing the placement surfaces within the graphical preview by the customer user using the dimension adjustment control, reidentifying and repopulating the placement point previews for the selected component according to the adjusted dimensions of each placement surface.

15. The method as recited in claim 14, wherein:
the step of adding the selected virtual component is followed by the step of repositioning the selected virtual component within the graphical preview along the placement surface by the customer user via a repositioning tool.

16. The method as recited in claim 14, wherein:
the step of creating a customized layout further comprises defining a frame material selection and a top component; and
the step of generating a support frame further comprises forming the vertical faces using structural components matching the frame materials selection, and forming the horizontal face using the top component.

17. The method as recited in claim 15, wherein:
the classification metadata for each virtual component further contains pricing data; and
the step of displaying a quote management interface further comprises generating a materials price estimate for the customized layout based on the pricing data of each structural component, top component, and appliance within the customized layout.

18. The method as recited in claim 17, wherein:
the design platform further has a component management module implemented by the control server;
the step of maintaining a component library is followed by the step of creating a component offerings list by the component management module associated with one of the providers which identifies the virtual components offered by the provider;
the step of initiating the user application further comprises initiating the user application via a provider portal associated with one of the providers by one of the customer users via the user device; and
the step of displaying a component selection interface further comprises filtering the component list by the component management module to display the virtual components specified by the component offerings list of the provider associated with the provider portal.

19. The method as recited in claim 17, wherein:
the design platform further comprises an output module implemented by the control server;
the step of saving the customized layout further comprises the customization data containing support frame data describing the perimeter shape, the perimeter dimensions, the frame material selections of the support frame, and the top component, the customization data further containing appliance data identifying each virtual component within the customized layout, the appliance data containing spatial positioning data identifying the placement surface upon which the virtual component was placed and the relative position and orientation of the virtual component upon the placement surface;
the step of saving the customized layout is followed by the step of exporting the customization data as a two dimensional graphical output for storage within the platform data store, the graphical output forming a template which facilitates installation and assembly of a food support structure in accordance with the customized layout.

20. The method as recited in claim 19, wherein:
the step of exporting the customization data further comprises generating a cutout template for each of the virtual components within the customized layout, the output module using the cutout dimensions of the virtual component and the associated spatial positioning data to place the cutout template upon the placement surface associated with the virtual component, the cutout template defining the void to be formed in the placement surface to allow installation of the appliance; and
the step of viewing the quotes by the customer is followed by the step of downloading the two dimensional graphical output and the cutout templates by the provider associated with the accepted quote.

* * * * *